United States Patent [19]

dos Santos

[11] 3,835,468

[45] Sept. 10, 1974

[54] RATIONAL ALPHABETIC SYSTEM

[76] Inventor: Antonio Monteiro Alves dos Santos, Rua Fernao Alvares do Oriente, No. 4, 2nd, Drto. Bairro des S. Miguel, Lisbon, Portugal

[22] Filed: June 29, 1972

[21] Appl. No.: 267,579

Related U.S. Application Data

[63] Continuation-in-part of Ser. No. 788,246, Dec. 31, 1968, abandoned.

[30] Foreign Application Priority Data

Jan. 2, 1968 Portugal ................................ 48892

[52] U.S. Cl. ............... 340/365 R, 197/99, 197/107, 200/4, 200/157

[51] Int. Cl. ........................................... H01h 13/72

[58] Field of Search ............ 340/365 R, 365 E, 337, 340/339, 324 A, 325, 407; 200/4, 157; 197/99, 107

[56] References Cited

UNITED STATES PATENTS

| | | | |
|---|---|---|---|
| 2,060,431 | 11/1936 | Spicer | 197/107 X |
| 2,552,622 | 5/1951 | Neergaard | 178/18 X |
| 2,581,665 | 1/1952 | Jarmann | 200/157 X |
| 2,903,687 | 9/1959 | Baer et al. | 340/365 R |
| 2,980,228 | 4/1961 | Wlodarczak | 197/107 |
| 3,022,501 | 2/1962 | Seigle | 340/365 |
| 3,022,878 | 2/1962 | Seibel et al. | 340/365 R X |
| 3,062,921 | 11/1962 | White | 340/365 R X |
| 3,133,151 | 5/1964 | Burns | 178/18 |
| 3,369,643 | 2/1968 | Avgerinos et al. | 197/107 X |
| 3,478,351 | 11/1969 | Fenton | 340/407 |
| 3,507,376 | 4/1970 | Kafafian | 197/99 X |
| 3,525,989 | 8/1970 | Fagan | 340/407 X |
| 3,541,541 | 11/1970 | Engelbart | 340/324 A |
| 3,573,412 | 4/1971 | Uhrich | 200/4 UX |
| 3,700,836 | 10/1972 | Rackson | 200/157 |

*Primary Examiner*—David L. Trafton
*Attorney, Agent, or Firm*—Robert E. Burns; Emmanuel J. Lobato; Bruce L. Adams

[57] ABSTRACT

Apparatus having a plurality of elements disposed relative to each other or movable to different positions relative to each other in which the positions correspond to information and that information may be read-out in matrix form or as characters and forms of writing according to the invention. The apparatus are manipulatable by movable parts of the bodies of handicapped operators for control of other apparatus. Apparatus for communicating with the blind provide outputs according to a communication system of symbols and characters and writing and reading apparatus for the blind operate within the communication system.

1 Claim, 84 Drawing Figures

STRUCTURE OF THE COMMUNICATION SYSTEM

| STRUCTURES | | ALGEBRAS | | DESIGNATIONS |
|---|---|---|---|---|
| | | AXIOMATIC | SEMIOLOGIC | |
| OF THE UNIVERSE | SUB-ALPHABETICAL | $\exists \{x\} \equiv U$<br>$\vdash \forall x\, Im(x)$ | $\{\cdot\} \rightarrow \{x\} \equiv U$ | BERGSONIAN-TEILHARDIAN UNIVERSE |
| OF THE SYSTEM | ALPHABETICAL | $\vdash : \exists \{u\} = W \subset U$<br>$\{e \perp e\} \rightarrow \{e\} \subset \{u\}$<br>$\{u \perp u\} \rightarrow \{i\}$<br>$\{i \perp i\} \rightarrow \{q\}$<br>$\{q \perp q\} \rightarrow \{d\}$<br>$\{d \perp d\} \rightarrow \{a\}$<br>$\{a \cdot d\} \rightarrow \{c\}$<br>$\{d \perp d\} \rightarrow \{d'\}$<br>$\{a \perp a\} \rightarrow \{a'\}$<br>$\{(d \perp d) \cdot (a \perp a \perp a)\} \rightarrow \{c'\}$<br>................<br>$\{u, e, i, \ldots\} \subset \{x\}$<br>$\{x \perp x\} \equiv \{\forall x \perp \forall x\}$ | $\{\cdot\} = W \subset U$<br>$\{\cdot\cdot\} \rightarrow \{,\} \subset \{\cdot\}$<br>$\{\cdot\cdot\} \rightarrow \{-\}$<br>$\{--\} \rightarrow \{\top\}$<br>$\{(\top)(\top)\} \rightarrow \{+\}$<br>$\{(\top)(\dashv)\} \rightarrow \{\times\}$<br>$\{\times +\} \rightarrow \{\ast\}$<br>$\{+ +\} \rightarrow \{+ +\}$<br>$\{\times \times\} \rightarrow \{\times \times\}$<br>$\{(\times\times\times) \cdot (+ +)\} \rightarrow$<br>$\rightarrow \{\ast \ast \times\}$ | 1-MONADE<br>0-NEUTRAL ELEMENT<br>2-BIT<br>$2^2$-PAIR OF BITS<br>$2^4$-UNIVERSAL DIGIT (+CROSS)<br>$2^4$-OPERATING DIGIT (×CROSS)<br>$(2^4)(2^2)$-UNIVERSAL CHARACTER (OCTET)<br>$(2^4)^2$-COMPOUND UNIVERSAL DIGIT<br>$(2^4)^2$-COMPOUND OPERATING DIGIT<br><br>$(2^4)^3(2^4)^2$-COMPOUND UNIVERSAL CHARACTER |
| | SUPERALPHABETICAL: LINGUISTIC | $\vdash : \{c\} = C \subset U$<br>$\{c \perp c\} \rightarrow \{s\}$<br>$\{s \perp s\} \rightarrow \{s'\}$<br>$\{s \perp s\} \rightarrow \{m\}$<br>$\{m \perp m\} \rightarrow \{m'\}$<br>$\{m \perp m\} \rightarrow \{l\}$<br>$\{l \perp l\} \rightarrow \{l'\}$<br>$\{m \perp m \perp l\} \rightarrow \{p\}$<br>................<br>$\{c, s, \ldots\} \subset \{x\}$ | | CHARACTER<br>SIMPLE SYLLABLE<br>COMPOUND SYLLABLE<br>SIMPLE WORD<br>COMPOUND WORD<br>SIMPLE PHRASE<br>COMPOUND PHRASE<br>SIMPLE SENTENCE<br><br>LANGUAGES: LOGICAL, TECHNOLOGICAL, NATURAL |
| | TECHNOLOGICAL | VIDE PROCESSES, MEANS AND APPLICATIONS | | |

Fig. 1

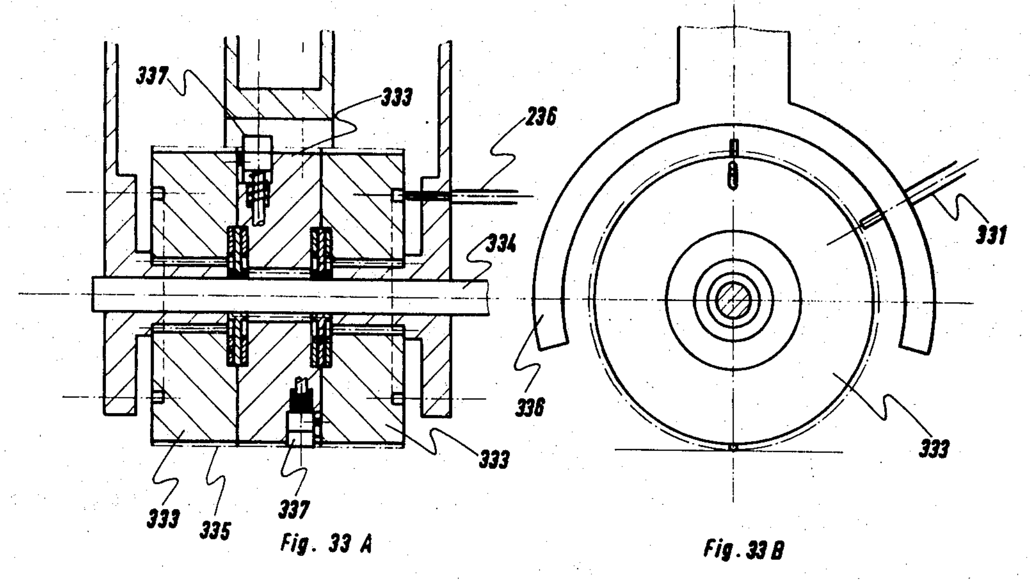
Fig. 33 A, Fig. 33 B
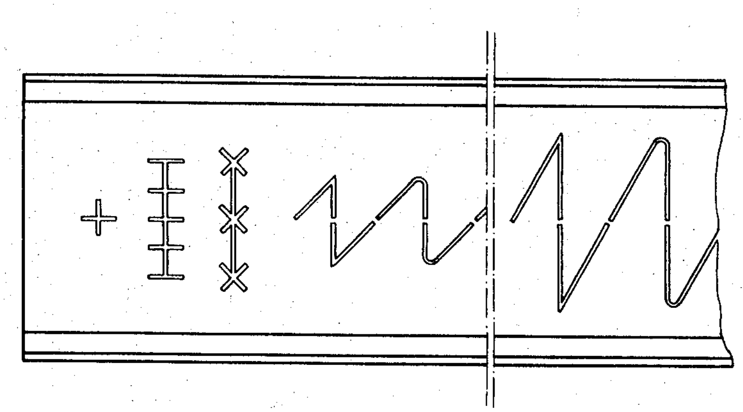
Fig. 34
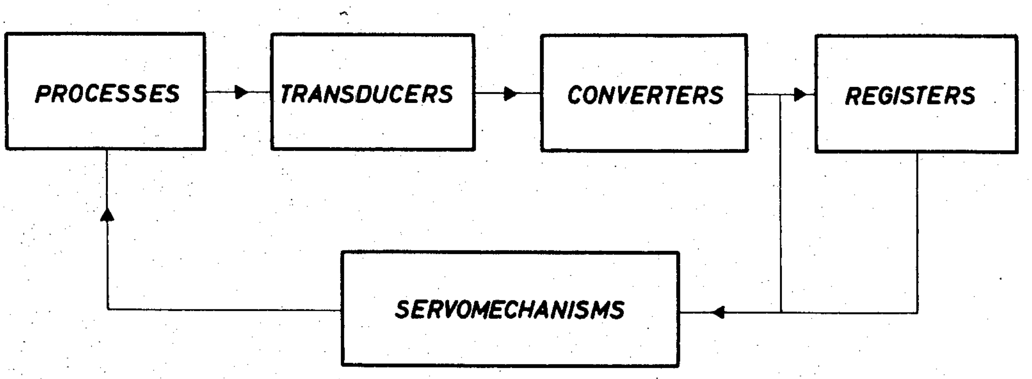
Fig. 35 ( INTERPRETERS )

RATIONAL ALPHABETIC SYSTEM

This is a continuation-in-part application of applicant's earlier application Ser. No. 788,246 filed Dec. 31, 1968, now abandoned.

BACKGROUND OF THE INVENTION

This invention relates generally to communications and more particularly to communication systems and apparatus.

Apparatus for communicating through characters or symbols are known. Thus modern coding machines transmit or communicate with a code or "language", for example "marks" and "spaces" or binary bits. Moreover, facsimile apparatus reproduce written and graphic matter and thus transmit information directly from a place of origin to a terminal.

Modes of communicating with those who have impaired physical faculties are also known. Thus braille is used for reading by the blind and hearing aids assist in direct communication with the deaf. Mathematical characters, algebras and other symbols are used in teaching machines in communicating scientific principles in mathematical language.

SUMMARY OF THE INVENTION

A principal object of the present invention is to provide apparatus which integrates machine movements representative of information and convert these to an intelligible language, for example a system of symbols which individually have information content or jointly form a composite symbol having a configuration or pattern corresponding to intelligible information content. The apparatus have a duality in that they can operate outside of the language system employed.

Another object is to provide apparatus by which human operators thereof can communicate with others although they may have physical defects that would otherwise preclude this communication.

Apparatus according to the invention have a plurality of elements movable relatively in a plurality of patterns of movement to define a plurality of relative positions that correspond to positions at which outputs are developed having information content.

These apparatus are constructed as keyboards having switches operated by keys that can be actuated individually only and are kept from being actuated jointly by cooperating slides or stretched cables and the like. The keys are arranged in some of the keyboards in arrangements simplifying their accessibility to the thumb and fingers of a human operator.

Others of the apparatus are usable by the physically handicapped in controlling machines or for writing and reading in the language of the system according to the invention. These apparatus are constructed as gloves with switch contacts mounted thereon for developing outputs or as elements actuated by flexible or movable parts of the body such as the wrist or hands. These latter devices may be constructed as bands or rings mounted on the wrist and held in the hand for coacting with electrical contacts thereon in developing electrical outputs.

The relatively movable elements can be constructed as carriages that have electrical contacts that develop electrical outputs. Writing and reading apparatus make it possible to communicate with the blind. The writing apparatus provide guides for writing instruments and the reading apparatus sense certain physical indicia that have information content and the outputs are detected by sensory techniques by the readers.

BRIEF DESCRIPTION OF THE DRAWING

Other objects and advantages will appear from the following description of examples of the invention, and the novel features will be particularly pointed out in the appended claims and drawings in which:

FIG. 1 is a table of communication structures for explaining the systems according to the invention;

FIG. 22A is a plan view of mechanism for read-out or a printer according to the invention;

FIG. 22B is a fragmentary elevation view of a groove cam of the mechanism in FIG. 22A;

FIG. 25A is a side elevation view of a reading device for the blind according to the invention;

FIG. 25B is a front elevation view of the reading device in FIG. 25A;

FIG. 25C is a fragmentary view on an enlarged scale of a part of the reading device in FIG. 25A;

FIG. 28A is an elevation view of a writing device according to the invention;

FIG. 28B is a fragmentary elevation view of a part of a writing device according to the invention;

FIG. 30A is a plan view of a writing device for the blind;

FIG. 30B is a section view taken along section line 30B—30B of FIG. 30A;

FIG. 30C is a fragmentary plan view of a frame of the device in FIG. 30A;

FIG. 30D is a fragmentary section view on an enlarged scale of the frame in FIG. 30C;

FIG. 30E is a fragmentary side view on an enlarged scale of a part of a writing guide of the device in FIG. 30A;

FIG. 30F is a fragmentary plan view of the writing guide in FIG. 30E;

FIG. 30G is a variation of a guide track for the writing device in FIG. 30A;

FIG. 33A is a section view of an electro-mechanical printer according to the invention;

FIG. 33B is a side elevation view of the printer in FIG. 33A;

FIG. 34 is a plan view of a stencil illustrating writing and characters according to the invention;

FIG. 35 is a block diagram for illustrating the universal application of the communication system of the invention;

DESCRIPTION OF THE PREFERRED EMBODIMENTS

Figure 2:
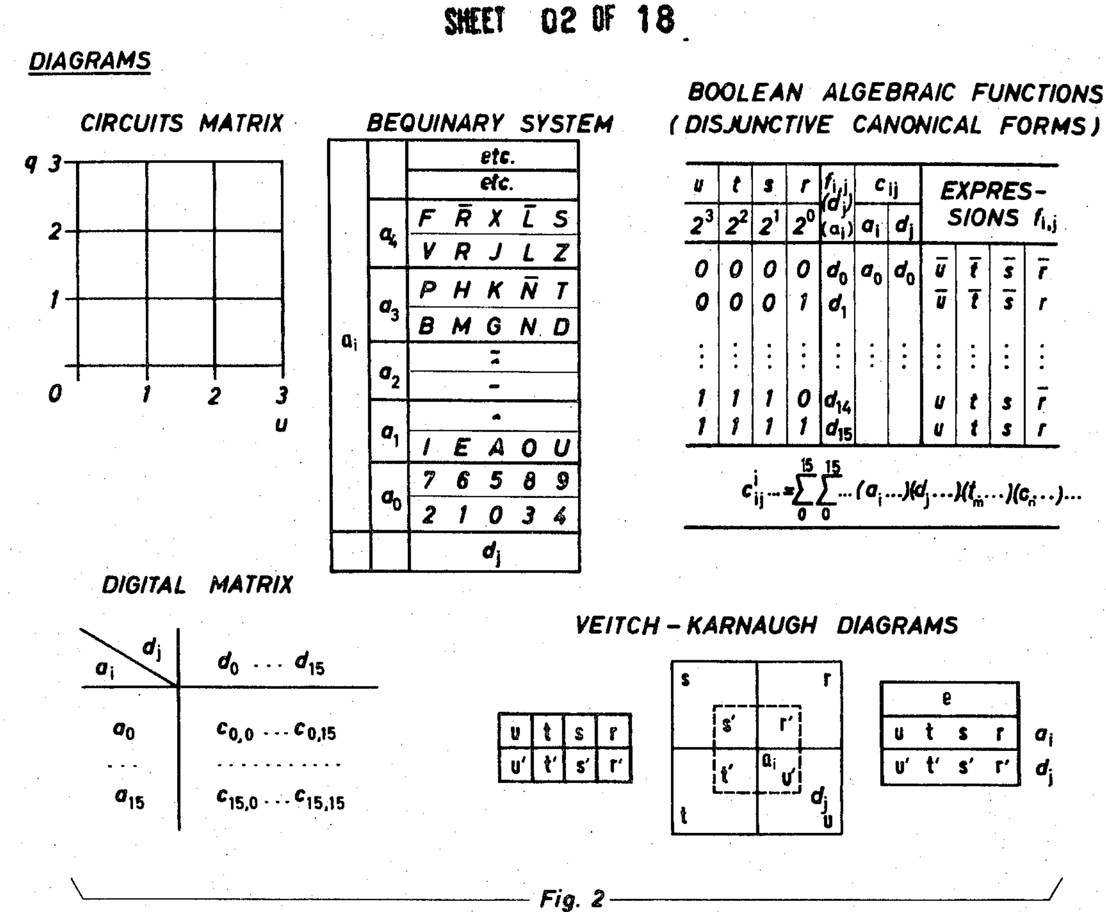
FIG. 2 is a set of diagrams for explaining the invention.
Figures 3A, 3B, 3C, 3D, 3E, 3F, 3G, 3H, 3I:
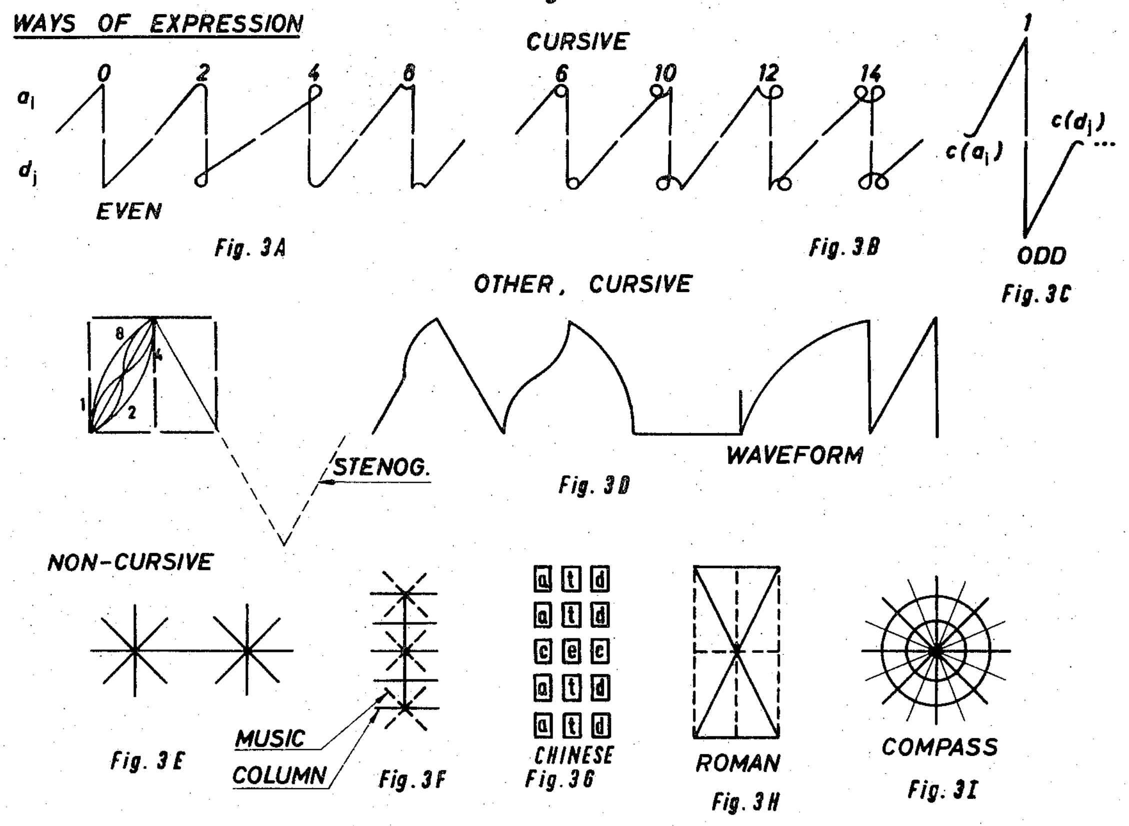
FIGS. 3A–3I are diagrams of writings that can be generated by apparatus according to the invention.

According to the invention as illustrated in the drawings FIGS. 1–4 illustrate a schematic structure of various modes, symbols and characters used for communicating information. The table in FIG. 1 shows the main structural areas of the communication system of the invention. The first two columns of the table are self-explanatory and columns three and four illustrate axiomatic and semilogic algebras. The last column proposes designations of characters and language to impart information. FIG. 2 is a table illustrating known algebraic, matrix or other diagrams and systems denoted and accordingly labeled for providing information content. FIGS. 3A–3I particularly illustrate the generation of waveform or stenographical systems that can be generated by using devices as hereinafter described. FIGS. 3E–3H illustrate symbols that can be constructed by devices according to the invention by a sequence of operations as hereinafter described. In the cursive writing an intersection of 1 and 2 or of 4 with 8, etc. can be indicated and the symbol system can be used as stenographic symbols.

Figure 4:
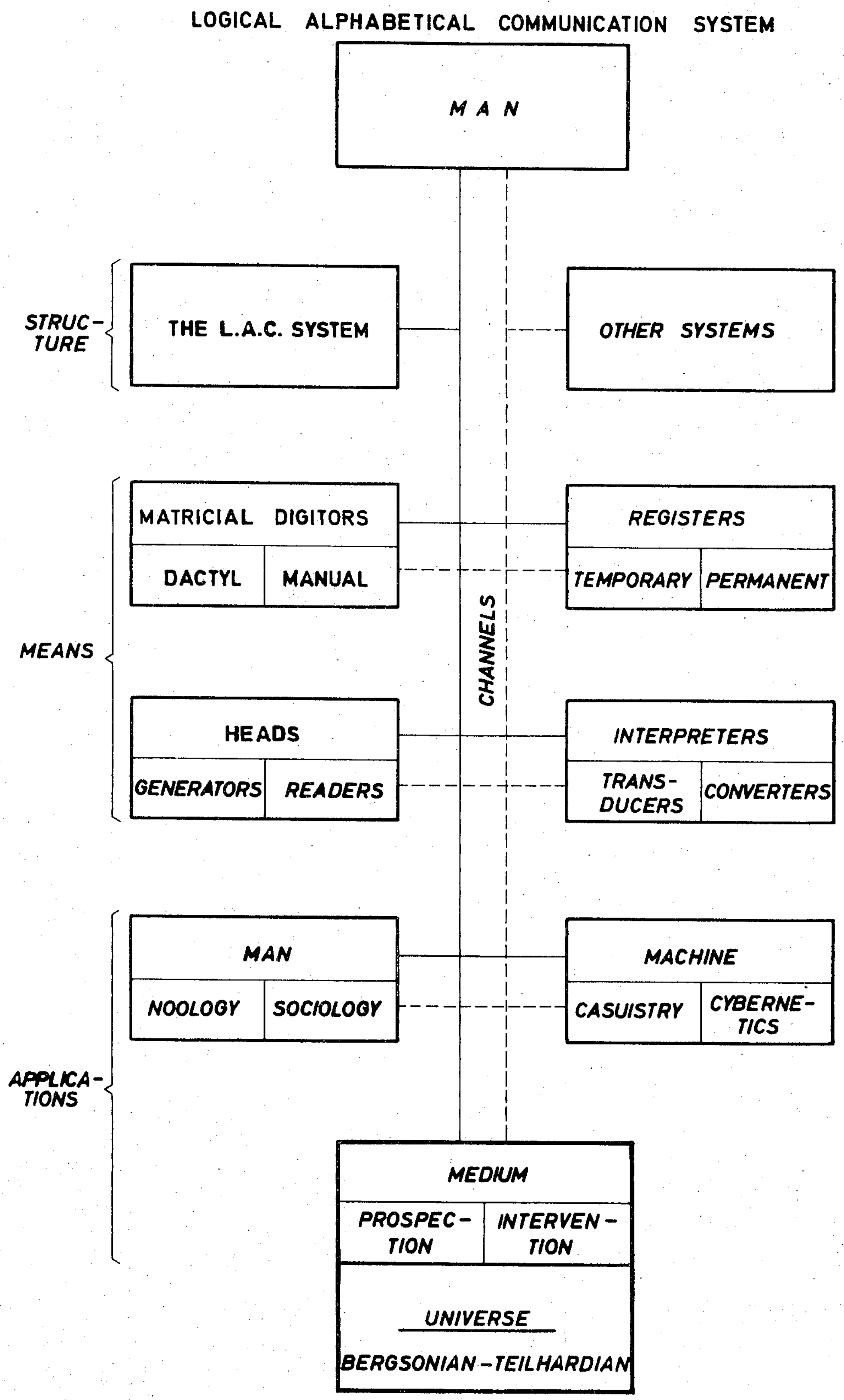
FIG. 4 is a block diagram of a generalized communication system for explaining general concepts of the invention.

FIG. 4 graphically illustrates the basic concepts of the present invention wherein Bergsonian-Teilhardian concepts with respect to the manner in which man relates to the universe and particularly the means such as digitors and keys for coordinating registers and interpreters in imparting temporary and permanent information by conversion of signals or reading thereof and interpreting them and transmitting outputs in a different form.

Thus the present invention deals broadly with the concept of communications and the transmission of information in one form to another, for example, the transmission of readings of different types of physical structures such as the reading by keys of information content in holes in a medium and transmitting it by transducers in a different form.

Figure 5:
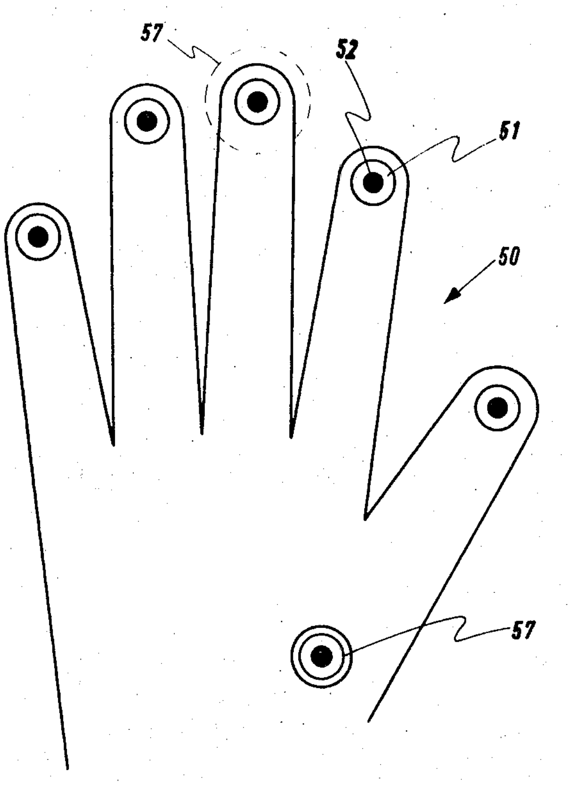
FIG. 5 is a plan view of a glove embodying the invention.
Figure 6:
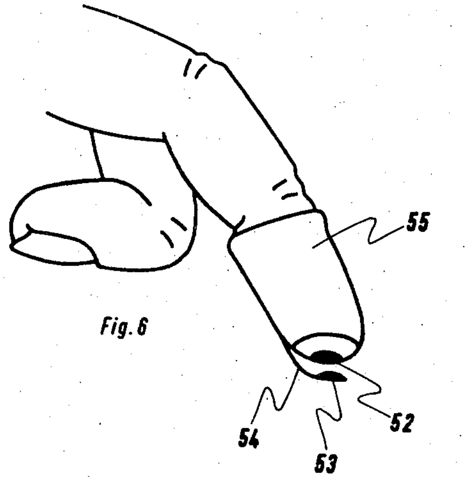
FIG. 6 is an elevation view of a thimble provided with electrical contacts according to the invention.

As illustrated in FIGS. 5 and 6 a glove 50 is provided with switches constructed as switch contacts on each digit. The switches constitute an insulating member 51 by which a fixed contact 52 is mounted on each finger of the glove and a movable contact 53 is mounted on a flexible support 54. The stationary contact 52 and the movable contact 53 are provided with electrical conductors providing connection to an apparatus, for example, being controlled. The control device may be constructed as a glove as illustrated in FIG. 5 or simply as thimble 55 as illustrated in FIG. 6. The glove device is provided with a sixth combination of contacts illustrated at 57. Those skilled in the art will recognize that the apparatus provides a control or communication mechanism for one who is handicapped, for example, a person with only one hand, to control easily and readily the generation of command or output signals for controlling a controlled element or apparatus. Moreover, the electrical outputs can be supplemented by a mechanical command signal, for example by applying the palm of the operator using the glove in FIG. 5 for effecting a mechanical movement of some type or applying pressure to some pressure-responsive element.

Figures 7A, 7B, 7C:
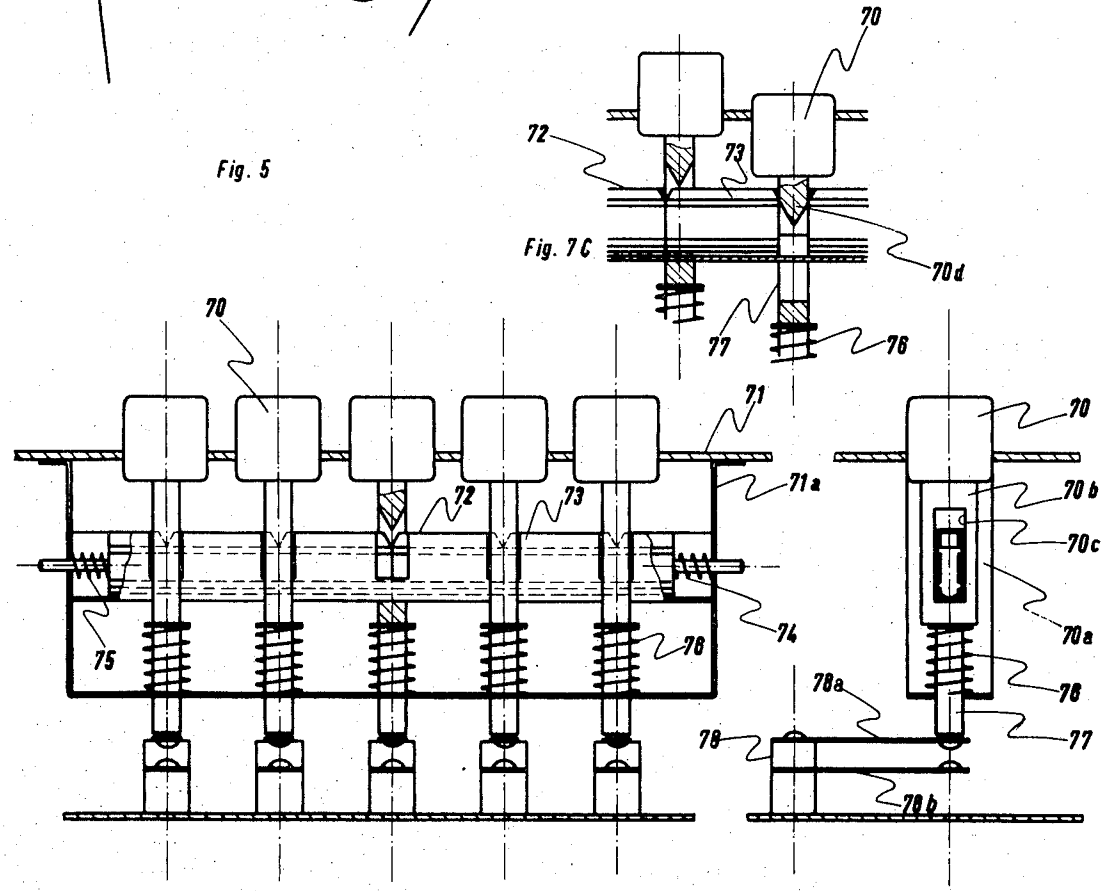
FIG. 7A is an elevation view of a keyboard according to the invention.
FIG. 7B is a fragmentary elevation view of the keyboard in FIG. 7A taken at 90° to the view in FIG. 7A.
FIG. 7C is a fragmentary view of a part of the keyboard in FIG. 7A.

A pentadactyl keyboard device is illustrated in FIGS. 7A–7C comprising a plurality of keys 70 mounted on a support 71. Each key 70 is provided with a guide bracket 70*a* and a downward extension or bar 70*b* of each key having a window 70*c* through which extends a plurality of slider or blocks 72,73 disposed end-to-end and biased to an abutting relationship by springs 74,75 bearing against the bracket 71*a* as illustrated. Each key is biased into a raised position by a corresponding biasing spring 76 so that a switch actuating pin 77 connected to the key extension is in a retracted position and is not pressing a movable contact 78*a* of a corresponding switch 78 for closing and making contact with a fixed contact 78*b*. Each switch 78 is normally in an opened condition. Each switch-actuator pin 77 extends axially into the key bar 70*b* and is engaged for actuation by a pin 70*d* extending downwardly from each respective key.

In the apparatus illustrated in FIG. 7 a group of five keys are illustrated and only one may be depressed at a time. The blocking sliders 72,73 will abut with the bracket 71*a* which forms a stop, when one key is depressed. Thus a key is depressed as illustrated in FIG. 7*c* and it will thereby separate two adjacent sliders or slider blocks 72,73 along abutting edges which are constructed to form a tapered recess as illustrated in FIGS. 7*a* and 7*c* so that only one switch 78 may be closed at a time.

Figure 8A:
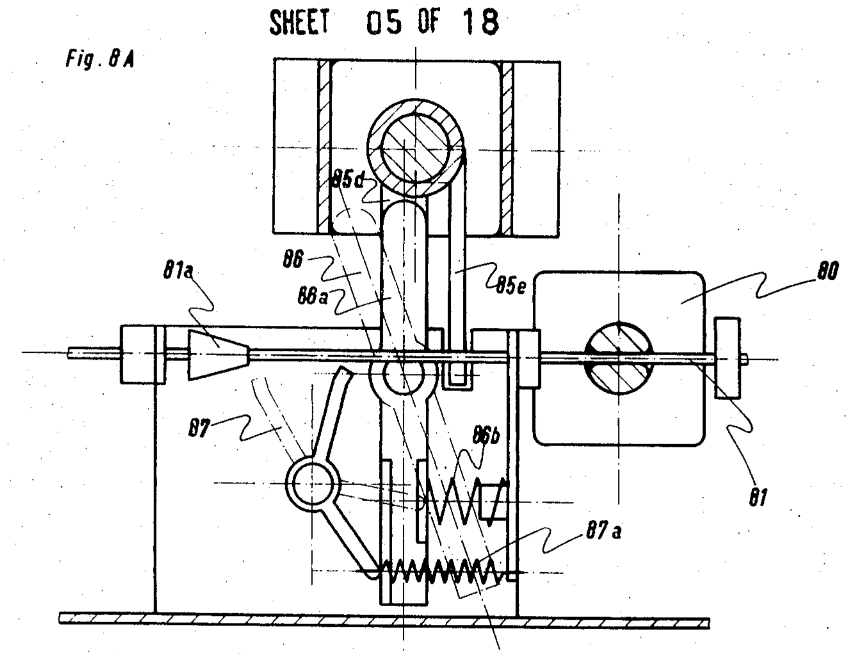
FIG. 8A is a plan view of a keyboard according to the invention.
Figure 8B:
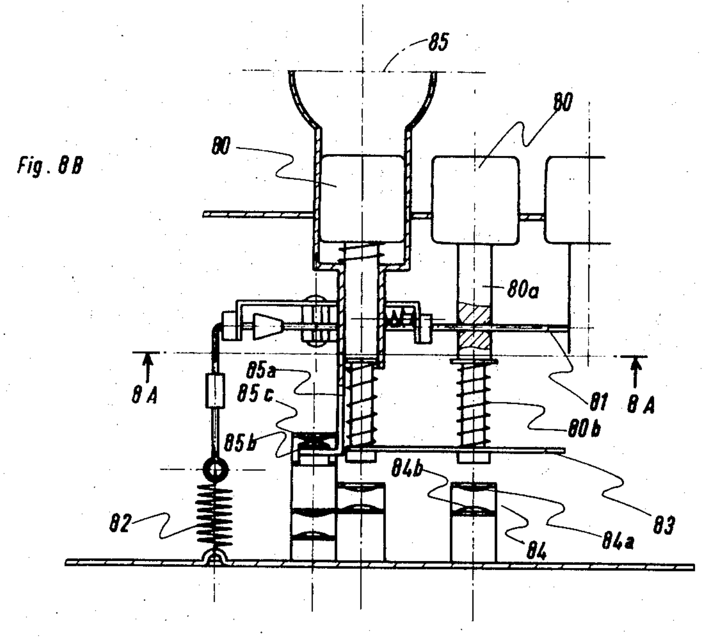
FIG. 8B is an elevation view of the keyboard in FIG. 8A.

In FIGS. 8*A* and 8*B* another tactile key device is illustrated. In this device a preselection key system is employed. Thus as illustrated a plurality of keys 80 have a pin 80*a* integral therewith through which extends a wire 81 held in a stretched condition by a spring 82. Each key is biased upwardly by a respective spring 80*b* bearing on a support surface 83 illustrated fragmentarily. The wire is held in a taut condition with the keys and their pins in an upwardly biased or retracted position. Only one key at a time may be pushed downwardly to close a respective switch 84 having a movable contact 84*a* engaging a fixed contact 84*b*.

One of the keys 80 is offset from the others as illustrated in FIG. 8A and is provided with a preselector key 85 which is movable upwardly and downwardly relative to its respective key 80, and in the position illustrated is in a raised position so that a downwardly extending arm 85*a* carrying a contact 85*b* causes the contact 85*c* to be engaged and a circuit closed. The preselector key has an arm 85*e* for actuating the taut wire 81 while the other keys have the wire passing therethrough. The key 85 is provided with a slot 85*d* in order for a locking-and-release system to allow up and down movement of the preselector key. The lock system comprises a pivotally mounted lever 86 biased to the position shown at 86*a* in solid lines by a spring 86*b*. A two-arm lever or butterfly lever 87 is biased in a counterclockwise direction by a spring 87*a* so that one of its arms holds the locking lever 86 in the position illustrated in broken lines. The preselector key 85 is released from its raised position when the locking lever is shown in its position at 86*a* and is in its locked position when the locking lever 86 is moved to its broken line position and it holds the preselector key raised. The key is released by a tapered member 81*a* fixed to the wire and travelling therewith. It will engage the butterfly lever 87 and release the lock of the apparatus when a key is depressed.

The device can be provided with several preselector keys so that a plurality of preselections can be made. Thus if five keys are used with three preselector keys, for example, eight elements are provided making possible eight selections or operations.

In the apparatus illustrated in FIGS. 8A–8B the preselector key can be mounted on the machine itself so that a preselector key concept need not be applied to the control keyboard as described heretofore. The same is true of the device illustrated in FIGS. 9A and 9B later described.

As illustrated therein, a stretchable or flexible band 90 has contacts 90*a*. The band 90 is flexible and is made of an electrically insulative material so that only individual contacts 90*a* can be depressed at one time into contacting fixed contacts 91,92 connected to electrical circuitry, for example on a circuit board 94.

Figures 9A, 9B:
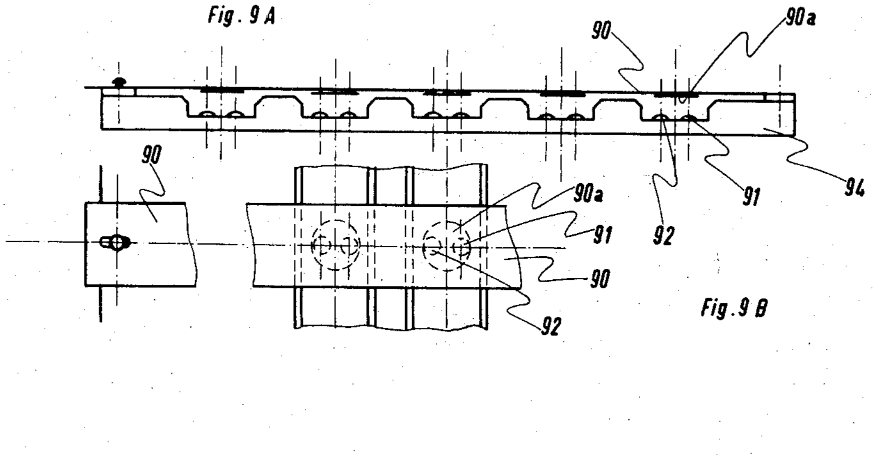
FIG. 9A is a diagrammatic side elevation view of another keyboard according to the invention.
FIG. 9B is a fragmentary plan view of the keyboard in FIG. 9A.

The construction in FIGS. 9A and 9B is an apparatus that can permit the use of two hands by an operator for carrying out the mode of operation thereof. That is to say, two devices can be provided and the circuitry may be controlled serially making certain that both hands are used in controlling the devices, or the circuitry may be in series within one device provided with sufficient contacts so that the operator must maintain both hands on the apparatus and accordingly, the devices or apparatus act as a safety device keeping the operator from using a hand elsewhere that might be dangerous, for example. The preselection function may be carried with this kind of an apparatus as before described since a machine, not shown, being controlled can be provided with a preselector key or preselector function.

Figure 10:
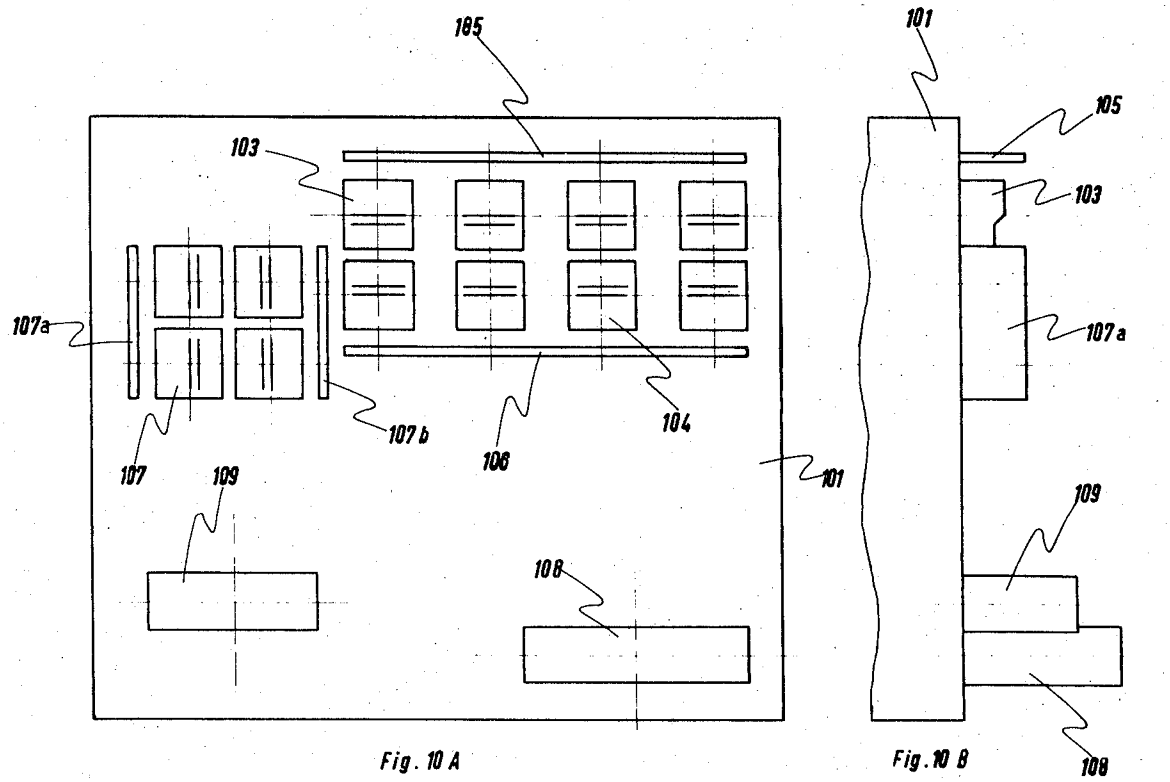
FIG. 10A is a plan view of a diagram of a heyboard illustrating key arrangement according to the invention.
FIG. 10B is an end elevation view of the keyboard in FIG. 10A.
Figure 11:
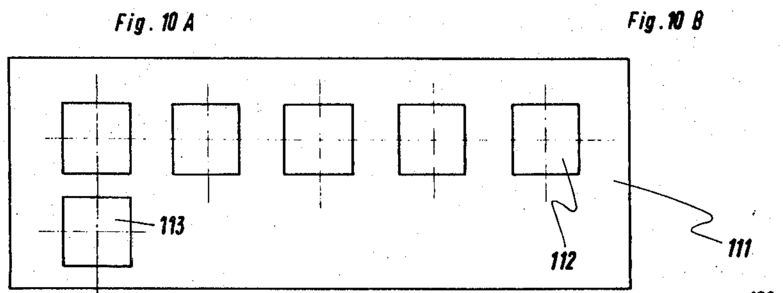
FIG. 11 and FIG. 12 are plan views of key arrangements for keyboards.
Figure 12:
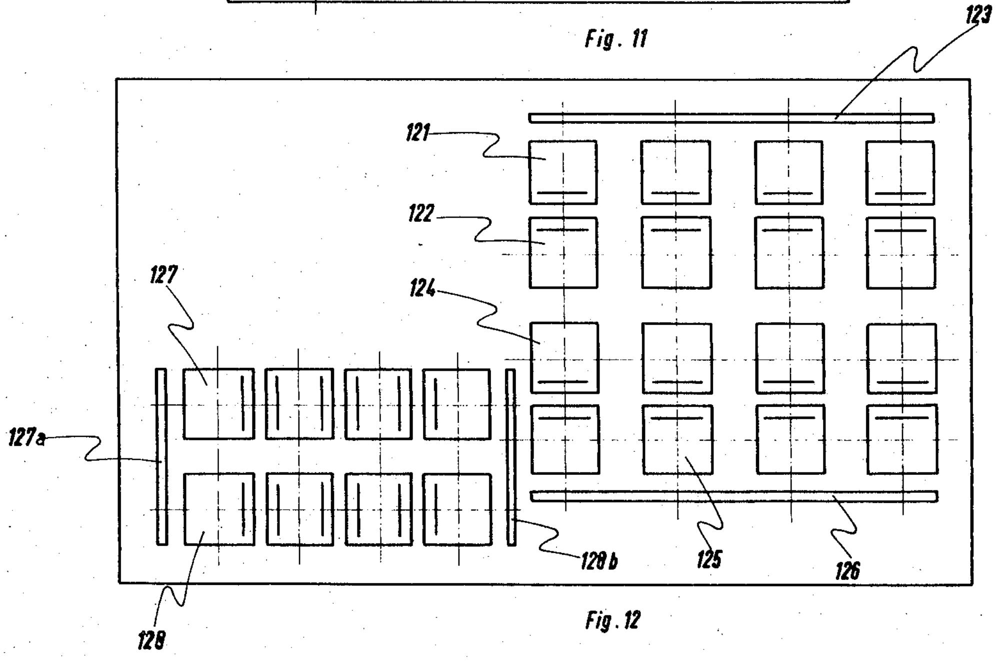

In FIGS. 10–12 inclusive a plurality of keyboards usable with other devices or apparatus are illustrated. For example, these keyboards may be used with apparatus in FIG. 14 as hereinafter described. A keyboard 101 is provided with one set of four keys 103 and a second set of four keys 104 which can be activated by the use of the operator's fingers of the right hand, for example. Two bar keys 105,106 may be operated with the thumb. A third set of keys 107 may be operated by the left hand of the operator and the associated keys 107*a*, 107*b* may be operated by the use of the thumb and the little finger. With the first set of keys we may also associate a heavy bar key 108 and with the second set a heavy bar key 109, both operated by the thumb of the operator. The keys may be used for controlling circuits, print-out devices and the like FIG. 11 has a keyboard 111 with five keys 112 and a fifth key 113 is operated by the thumb. This keyboard also has keys shown elongated similar to those in FIG. 10A that are actuated by lateral movement of the fingers or digits.

A more complex combination of keys is illustrated in FIG. 12 in which one set of four keys 121 is associated with a second set of four keys 122 and both are associated with a bar key 123 which provides for operating this group of keys with the four fingers and the bar operator key is operated with the thumb. As will be seen in the drawing, a third and fourth set of keys 124,125 is provided with a bar key 126 which is operable with the thumb. To the left of these four sets of keys are provided two sets of keys 127,128 with four keys in each set operated with the fingers and two bar keys to the right and left of the two groups constituting keys **127*a* and 128*a***.

Figure 13A:
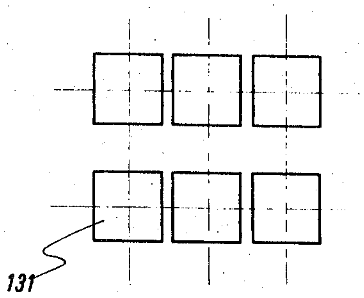
FIGS. 13A and 13B are diagrams illustrating possible key arrangements for keys actuatable with the thumb according to the invention.
Figure 13B:
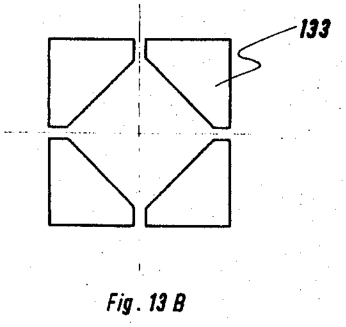

A plurality of arrangements and keyboards is possible. For example, in FIG. 13*a* six keys 131 arranged in two sets of three can be operated with the thumb of an operator and other keys, not shown, can be operated by the fingers. Moreover, in FIG. 13*d* keys 133 are arranged in a rectangular pattern spaced within four quadrants as illustrated. These can be actuated by the thumb and other related keys activated with fingers.

Thus all of these combinations of keys provide for controlling a multiplicity of devices including musical devices, for example. A keyboard of the type before described may be mounted on a table 141 mounted on a bracket 142 pivoted on a shaft 143. The shaft is mounted on a quadrant 144. The shaft 143 is provided with an arm **143*a* having a contact 143*b* making contact with a plurality of angularly spaced contacts, on the quadrant 144, with connections thereto, not shown, to circuits and as described later with respect to another quadrant of this apparatus. A second shaft 145 is mounted on quadrants 146,147. A quadrant 147 is provided with a plurality of contacts 147*a* so that an arm 145*a* connected to the second rotating shaft 145 can be moved to different angular positions for making contact therewith. The entire assembly is mounted on a pivot shaft 148. A plurality of springs 145*b*, 145*c*, 143*b*, 143*c* and corresponding stops as illustrated bias the shafts in brackets so that the assembly has forces applied thereto as illustrated in FIG. 14C to maintain the assembly in a horizontal condition. That is to say, the board or keyboard 141** is in a horizontal position.

Those skilled in the art can see that these contacts may be connected in a matrix configuration or circuit, not shown, so that the board can be moved around to develop different combinations of signals. Furthermore, if the keyboard 141 is provided with contacts of the type heretofore described, a multiplicity of various combinations of matrices and the like can be developed.

Figure 15:
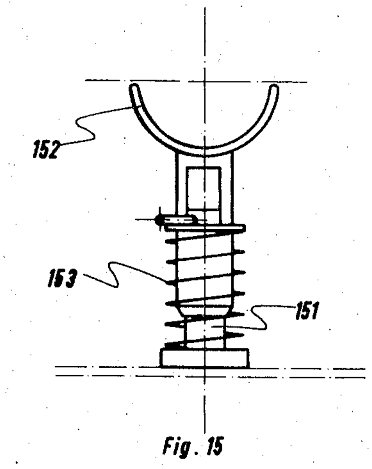
FIG. 15 is an elevation view of an apparatus usable as a printer according to the invention.

Another type of digitor is illustrated in FIG. 15 in which a pedestal 151 has a key 152 mounted thereon for angular and linear axial movement. The key is secured to a spring 153 which is likewise secured at one end to the support 151. Thus the key 152 can be depressed to various positions axially of the support 151 and can be rotated angularly relative thereto so that by a proper use of contacts and electrical circuits connected thereto the key 152 can control the development of controlled circuitry of a matrix, not shown. Thus linear movement of the key axially of the support could be the equivalent of columns and angular movement devised can be used as a matrix digitor.

Figure 16A:
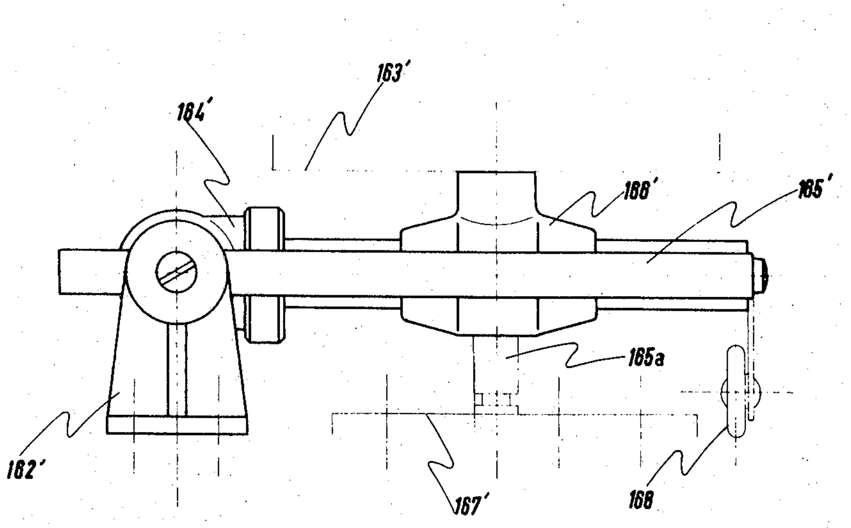
FIG. 16A is a side view of a T-type matrix device.
Figure 16B:
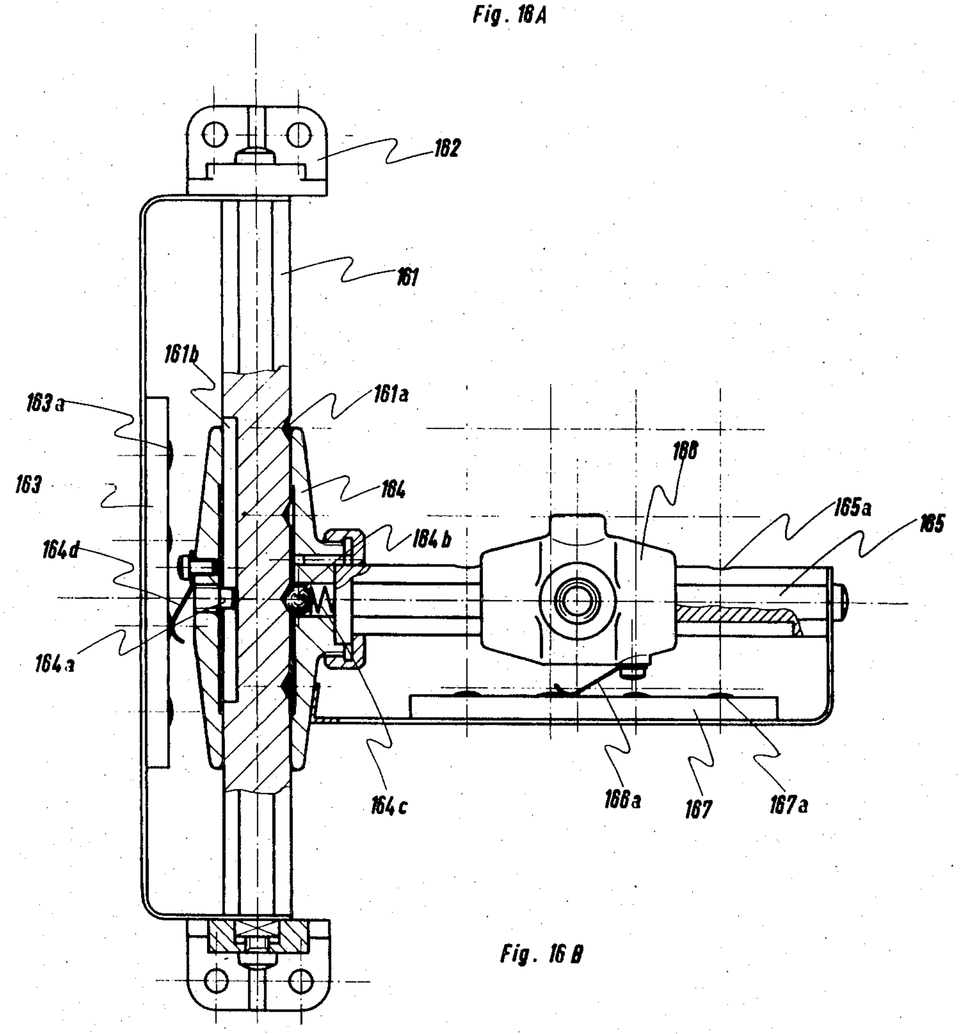
FIG. 16B is a plan view of a T-type matrix device.

A T-type digitor is illustrated in FIG. 16B. It comprises a shaft 161 on a support 162 on which is fixed a circuit board 163 with fixed contacts **163*a* thereon. The shaft 161 has a plurality of recesses 161*a* spaced axially thereon with an axial slot 161*b* and circumferentially of which is displaced a slider or sleeve 164. The sleeve has at one end a pin 164*a* for limiting travel axially of the sleeve at the ends of the slot and is provided with a recess radially at the shaft in which is disposed a ball 164*b* biased by a spring 164*c* into engagement with the recesses 161*a*. The sleeve carries a sleeve spring electrical contact 164*d*** with electrical connections to a circuit, not shown.

A handle 165 is provided fixed to the sleeve 164 and has a second sleeve 166 movable axially thereon and similarly provided with a biased ball for engaging axially spaced recesses **165*a* for spacing the slider or sleeve 166 or locating it at different axial positions on the handle. The slider 166 is provided with a flexible electrical contact 166*a* making contact with fixed contacts 167*a* of a circuit board 167. It is readily apparent that each slider 164, 166** may be moved axially of its respective shaft to provide a plurality of matrix contact positions corresponding to possible circuit connections for providing many different outputs.

The embodiment illustrated in FIG. 16A is constructed in a manner heretofore described so that the various elements therein having the same reference numerals primed, correspond to those described. In this structure a wheel 168 is fixed to the outer end of a handle or handle shaft 165' and a slider 166' thereon has a contact on the top making contact with a circuit board 163' on the top, shown schematically, and a thin electrical contact **165*a* makes connection with a circuit board 167'** or contact thereon as before described in the other embodiment. So that the various circuit selections of terminates or contacts may be executed in this apparatus in the manner heretofore described.

Figures 17A, 17B, 17C:
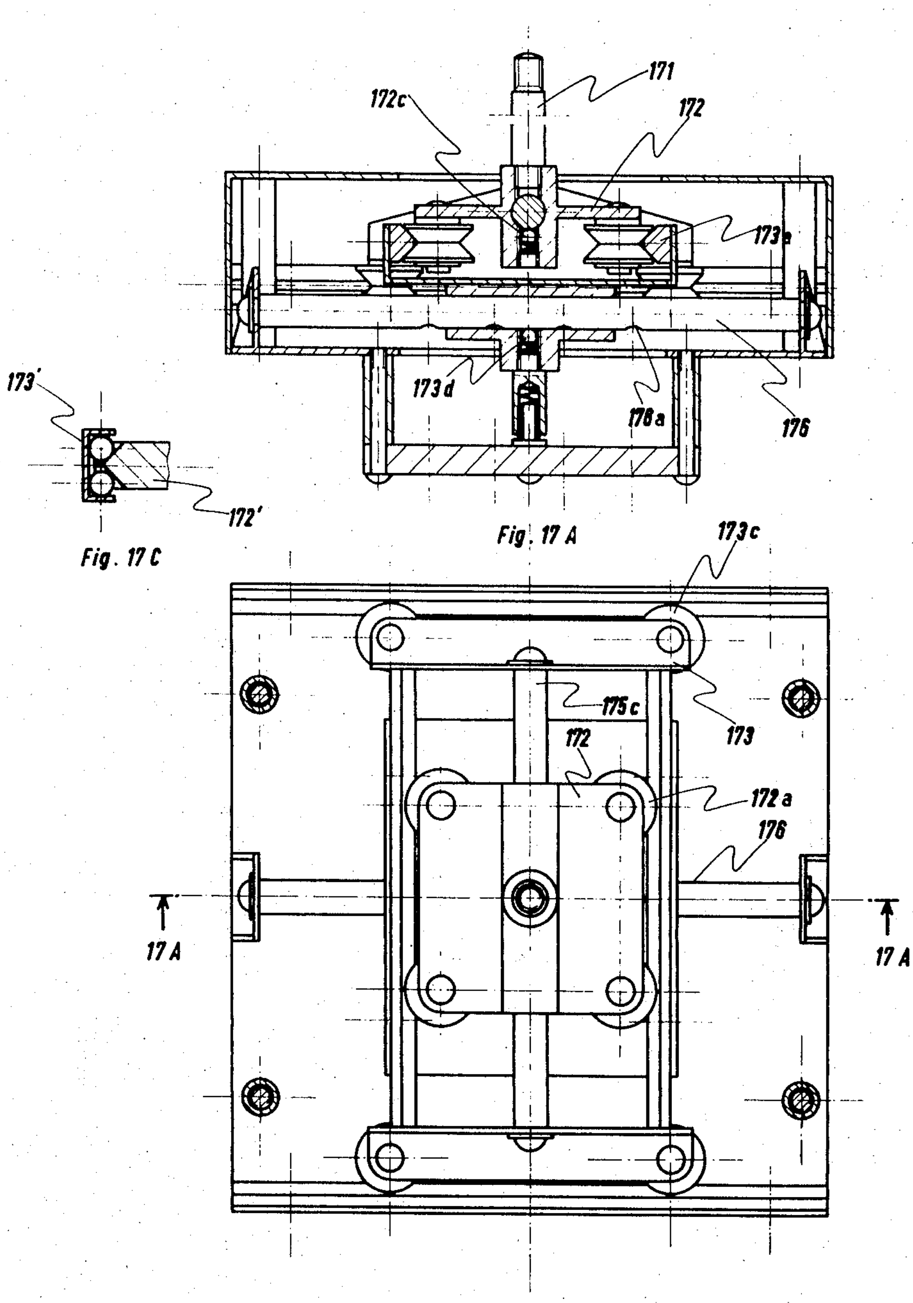
FIG. 17A is a section view taken along section line 17A—17A of FIG. 17B.
FIG. 17B is a carriage-type matrix device according to the invention.
FIG. 17C shows an alternative carriage suspension arrangement.

Relatively movable carriages rotatably mounted on rollers or wheels and movable in two axes normal to each other in a plane provide for digitor constructions of the invention. Thus as illustrated in FIGS. 17A and 17B a manipulator 171 is connected to a carriage element 172 provided with four rollers **172*a* guided on rails 173*a* which are parallel with each other and part of a carriage 173 provided with rollers 173*c* for movement of the carriage 90° to the first-mentioned carriage 172. By manipulating the manipulator it is readily apparent that the two carriages will move at 90° to each other and a shaft 175*c* is provided with recesses axially thereof so that a spring biased ball 172*c* will be engaged in the various recesses to locate the first carriage axially of the shaft at discrete axially separated positions. A second shaft 176 is provided with axially spaced recesses 176*a* for engagement of a spring biased ball 173*d*** in the axial recesses for locating the second carriage at discrete positions. Thus by properly providing discrete separate stops for each carriage and proper circuitry connections thereto, a matrix output can be developed.

Instead of relying on the type construction for the first carriage as illustrated in FIG. 17A, a second possible construction is illustrated in FIG. 17C in which a carriage 172' is guided on a guide constituting a part of a carriage 173'. In this construction ball bearings are provided as shown.

Figure 18A:
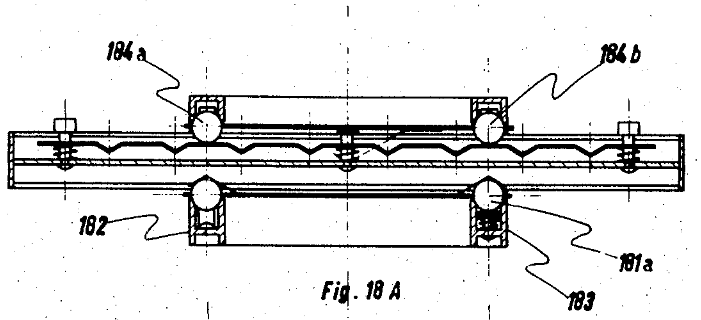
FIG. 18A is a section view of another carriage-type matrix device.
Figure 18B:
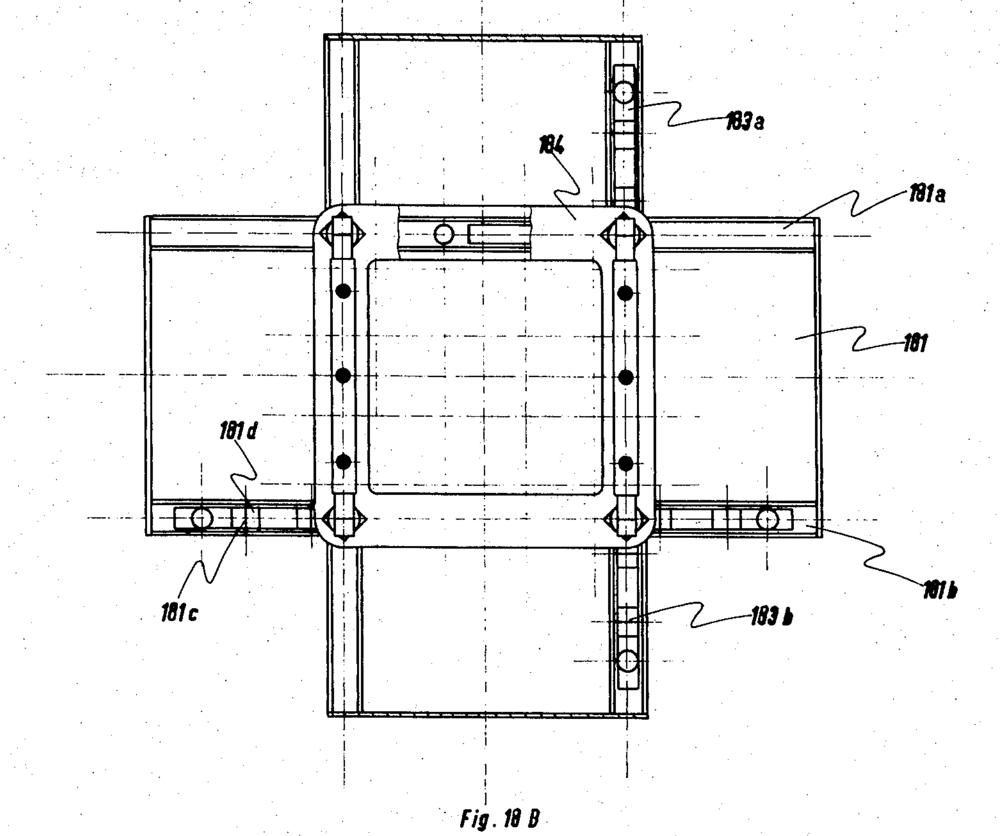
FIG. 18B is a plan view of the device in FIG. 17A.

Another possible system of carriages movable relatively for developing a matrix output is illustrated in FIGS. 18A and 18B in which a carriage 181 has four spherical rollers 181*a* riding in a pair of parallel channel supports 182,183. One of the channels is provided with a flexible band 183*a* having a plurality of axially spaced recesses 183*b* for locating the two sets of rollers or spheres on the large carriage 181 movable axially of the two guide supports. A second carriage 184 is movable at 90° to the first carriage and is carried thereon in channel guides 181*a*, 181*b* of the first carriage. One of the channels 181*b* is provided with a resiliently supported insulative strip 181*c* having a plurality of recesses 181*d* in which a set of rollers 184*a*,184*b* of the smaller carriage will engage to locate the second or smaller carriage in these positions.

Those skilled in the art will recognize that contacts may be disposed on the carriages in order to effect a matrix combination of outputs as before described.

Figure 19:
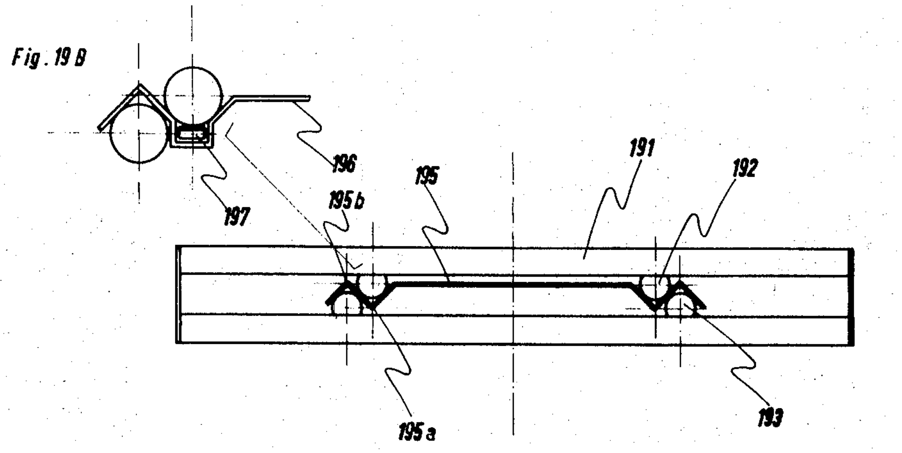
FIG. 19A is a section view of a third type carriage-type matrix device according to the invention.
FIG. 19B is a fragmentary section view of a variant of channel tracks for carriage-type matrix devices embodying the invention.

Another construction of these devices is illustrated in FIGS. 19A and 19B in which individual carriages, for example, a carriage 191, is provided with spherical rollers 192,193 riding in channels 195*a*,195*b* formed in a fixed member 195. The channels may be constructed in the manner of the illustration in FIG. 19B, which is a modification of the structure shown in FIG. 19A, in which a member 196 has channels illustrated in the cross section and the contacts 197 may be located in the one channel.

Figure 20A:
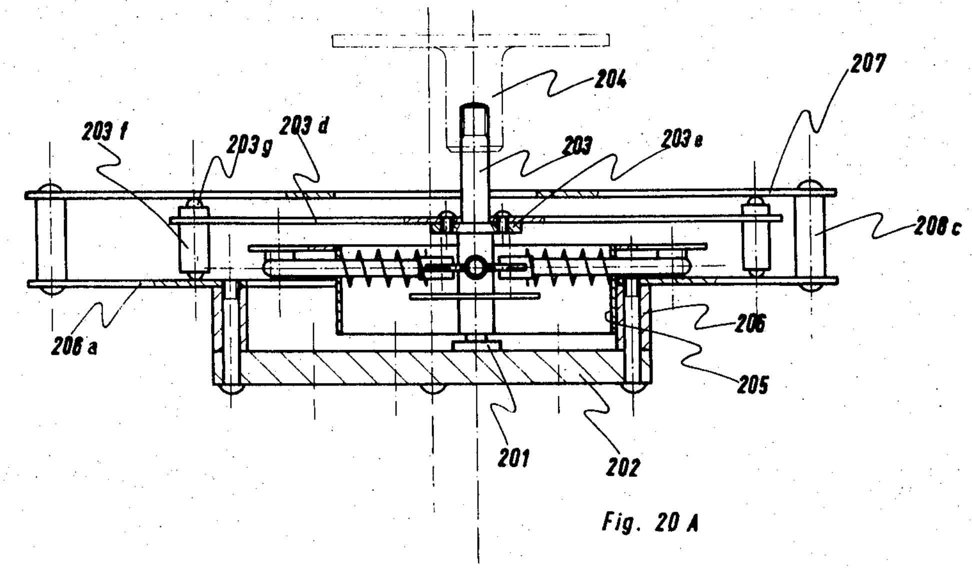
FIG. 20A is a section view of a drum-type matrix device according to the invention.
Figure 20B:
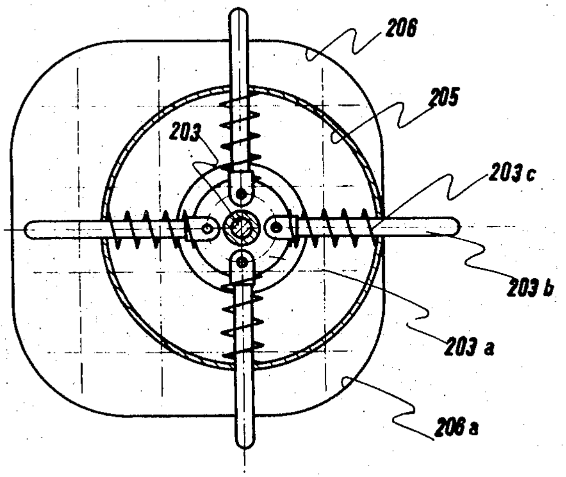
FIG. 20B is a plan view of the device in FIG. 20A.
Figure 21A:
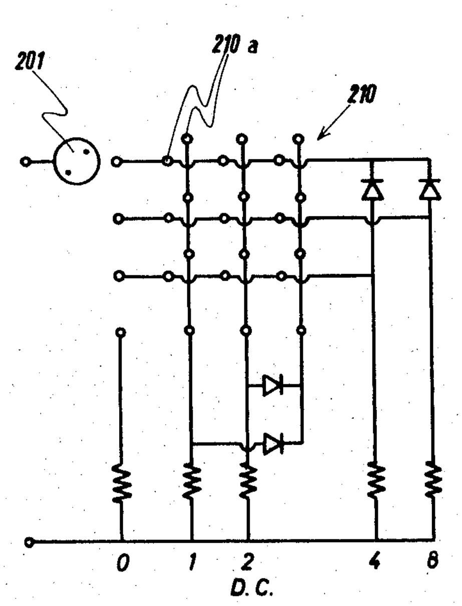
FIG. 21A is a diagram of a DC circuit used with the device in FIG. 20A.
Figure 21B:
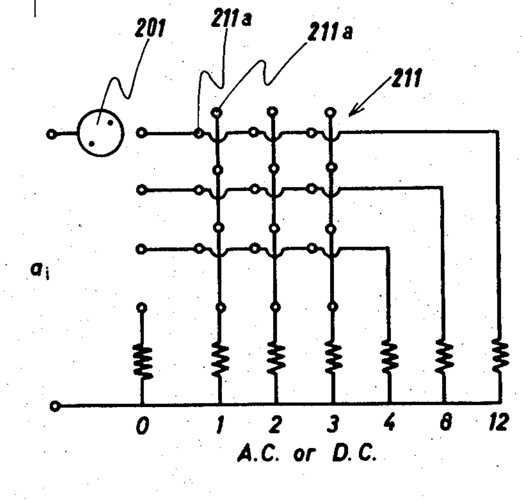
FIG. 21B is a diagram of an AC or DC circuit used with the device in FIG. 20A.

Another digitor is illustrated in FIGS. 20A and 20B in which an electrical brush or contact 201 rides or engages a circuit board 202 having electrical contacts or circuitry as illustrated in FIGS. 21A and 21B. The contact 201 is moved to by operator 203 received in a control element 204. The operator 203 is mounted so as to be guided on two plates or guide surfaces as hereinafter described.

The movable operator 203 transports a first drum 205 within a second drum 206. The operator 203 is provided with a circumferential flange 203*a* to which are connected four pins 203*b* at 90° to each other and having a spring 203*c* circumferentially thereof and bearing against the inner surfaces of the inner or first drum 205. As the operator 203 is moved, the inner drum 205 moves therewith until it engages a curved surface, for example the curved surface 206*a*, of the outer drum where it is held and the operator is then able to move relative to the inner drum 205 and compress the spring of the corresponding arm as it is located within the inner drum 205.

The outer drum 206 is provided with a flange 206*a* supporting an annular member 207 with angularly spaced supports 206*c* so that three arms 203*d* connected by circumferential flange 203*e* on the operator 203 maintain the operator upright since they are provided with followers 203*f* having bearings 203*g* at opposite ends thereof riding on the two guide surfaces 206*a*,207 as before described.

The contact 201 will be moved into positions for bridging terminals 210*a* of a circuit 210 or contacts 211*a* of a matrix circuit 211 as illustrated in FIGS. 21A and 21B. One of the circuits 210 is a circuit for direct current and the other circuit 211 can be used for direct or alternating current as illustrated by the legend thereon.

In FIGS. 22A and 22B a carrier mechanism for a device in accordance with the invention is illustrated. For example, a shaft 221 has mounted thereon for axial travel a sleeve 222 provided with a pair of projecting, flat arms 222*a*, 222*b* between which is mounted a carrier 223 having pins 223*a*, 223*b* received in a pattern of grooves 224 in which there are disposed a plurality of vertical grooves joining with a horizontal groove at the top and a plurality of lower grooves in communication with the vertical grooves which are at about 45° from the horizontal as illustrated in FIG. 22B. The grooves are provided with a plurality of gating elements 225, 226.

As can be seen, a gate 225 is associated with the vertical grooves and a second gate 226 is associated with the vertical grooves for entry thereinto. For example, assuming that the carrier 223 is to be moved from one vertical groove to a next position, it can travel upwardly and to a horizontal upper groove to any desired vertical groove and travel downwardly therein and open a corresponding flexible metallic gate 225 so that it enters a slanted groove and moves upwardly thereon and opens a gate 226 opening into the next vertical column so that a multiplicity of upward and downward movements are possible as well as horizontal movements of the carrier and movements along a plurality of paths that are at an angle relative to the vertical paths or grooves. Thus the carrier can be moved along a multiplicity of combinations of paths, by means not shown. The carrier can have printing elements thereon for effecting typing or printing thereby.

Figures 22, 23:
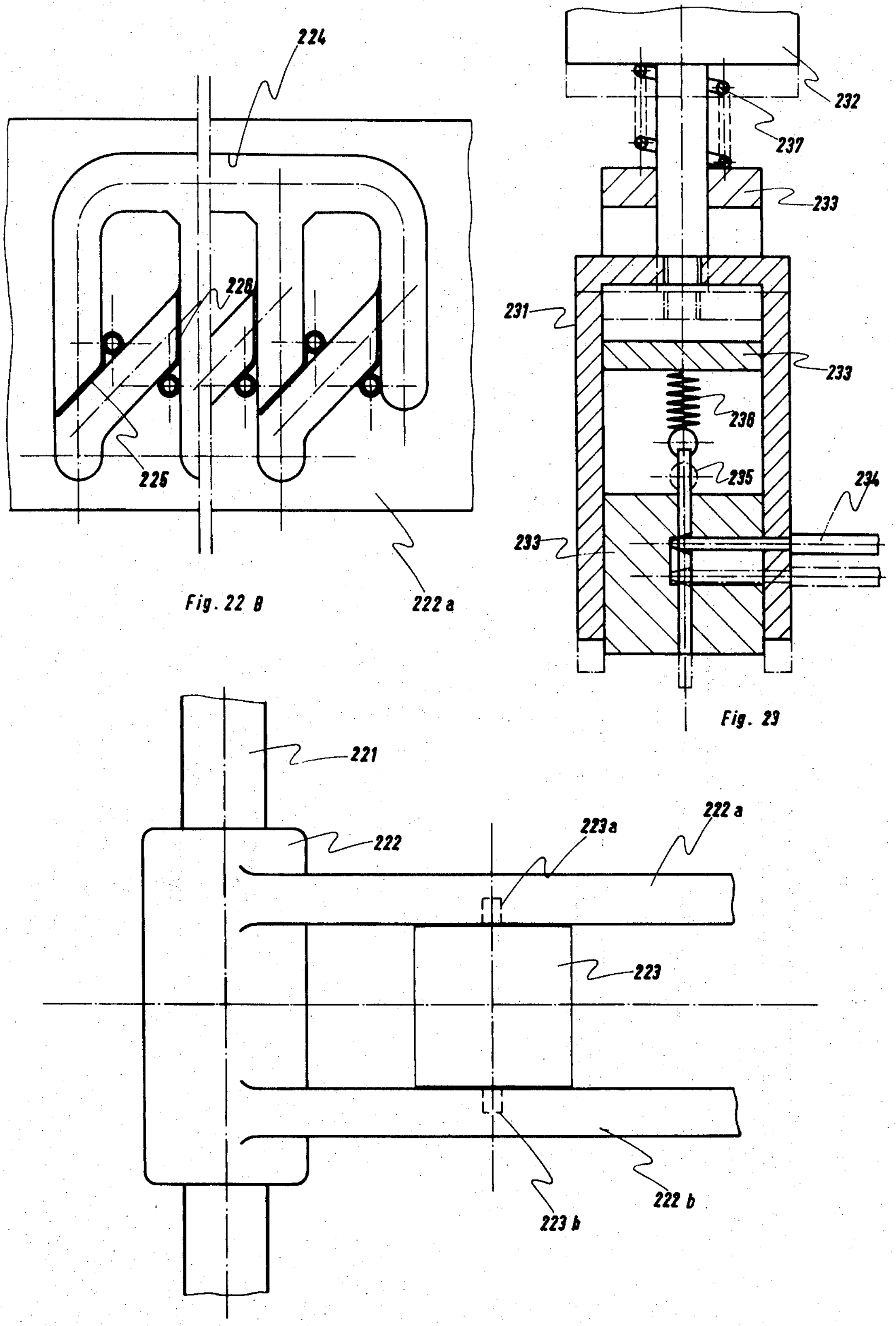
FIG. 23 is an elevation section view of another embodiment of a read-out or printer mechanism according to the invention.

The invention provides for apparatus for printing on traveling paper or carrying out punching operations that have information content with respect to the perforations executed thereby. A device for carrying out either punching or printing operations is illustrated in FIG. 23 in which a head 231 is actuated by an actuator 232 which is actuated downwardly by a solenoid mechanism so that as the head moves downwardly, a plunger 233 therein is free to move relative to the head. A plurality of these devices is provided and each is provided with a selector pin 234 which can be energized by circuitry energizing electromagnetic means for actuating the desired heads and the desired pins 234 so that the printing or punching bar 235 held by a spring 236 moves downwardly with the head for carrying out a printing operation or performing in dependence upon how the bar is constructed. A spring 237 restores the head upwardly when the actuator 232 has current to the solenoid actuating it deenergized.

A key holder mechanism for executing a multiplicity of translations and rotary movements is illustrated in FIGS. 24A–24D, wherein a head 240 has side extensions 240*a*, 240*b* received in two parallel plates 241,242 provided with grooves of the type illustrated in FIG. 22 so that the head can make translational movements upwardly and downwardly and horizontally as well as at an angle to the horizontal. The head is actuated by an electromagnet, not shown, and has connected thereto an inner element 240*c* which is a carrier rotated by a shaft 242 provided with a peripheral recess 242*a* for locking intermittently for each rotation by a locking cam 243 biased by a spring 244 into the locking position. The carrier 240*c* is provided with a pin projection 240*d* which travels in a pattern or path illustrated in FIG. 24D.

Figure 24:
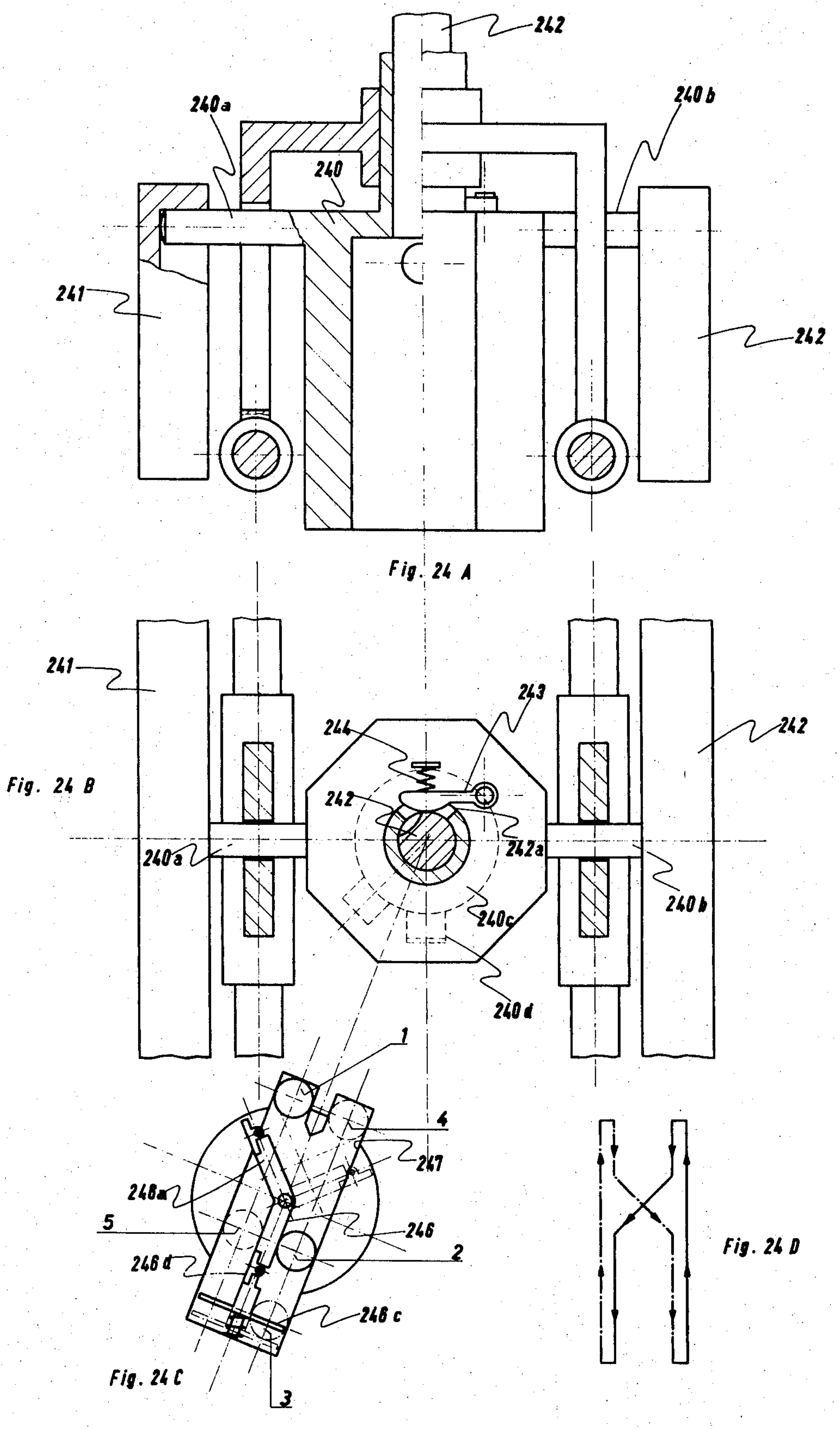
FIG. 24A is an elevation view of still another emcodiment of a read-out or printer mechanism.
FIG. 24B is a plan view of the mechanism in FIG. 24A.
FIG. 24C is a diagram of a device of the mechanism in FIG. 24A.
FIG. 24D is a diagram of a path of movement of an element in the device in FIG. 24C.

The shaft 242 will oscillate in either direction at about 45° to the left and the right alternately. The oscillations will drive the stud 240*d* to the six positions illustrated in FIG. 24D. The path travelled by the stud illustrated in FIG. 24D is established by a two-arm lever system 246 in which the two arm levers are provided with a common pivot. The stud moves through the pathway formed by the levers to the positions illustrated in FIG. 24C. It moves along the arm 246 and through channels of a cam 247 in which the lever system 246 is mounted. Thus a lever **246*a* allows the stud to move within the cam to the three positions 1,2,3 and back up to 4. The stud in its third position engages a "T" pin 246*c* biased by a spring into engagement with a pivoted locking lever 246*d* so that as the biased lever 46*c* is engaged, it is moved to a position to release the locking lever 246*d* so that the two arm lever 246 has its upper arm 246*a* shifted to the right so that the stud can move from position 4 to position 5 and then to a position 6 opposite to the third position so that the biased locking T lever 246** is again actuated to release the lever which again moves to the position to allow movement from the sixth position back to the first position.

It will be noted that the coupling lever 243 is biased into the recess 242 only every other rotational movement so that it couples the inner member to the outer member of the head to effect the two functions of developing two punching or printing operations with one command. This also means that translation in effect is only when both elements are coupled and the translation is effected in the manner illustrated in FIG. 22.

Figures 25, 26, 27:
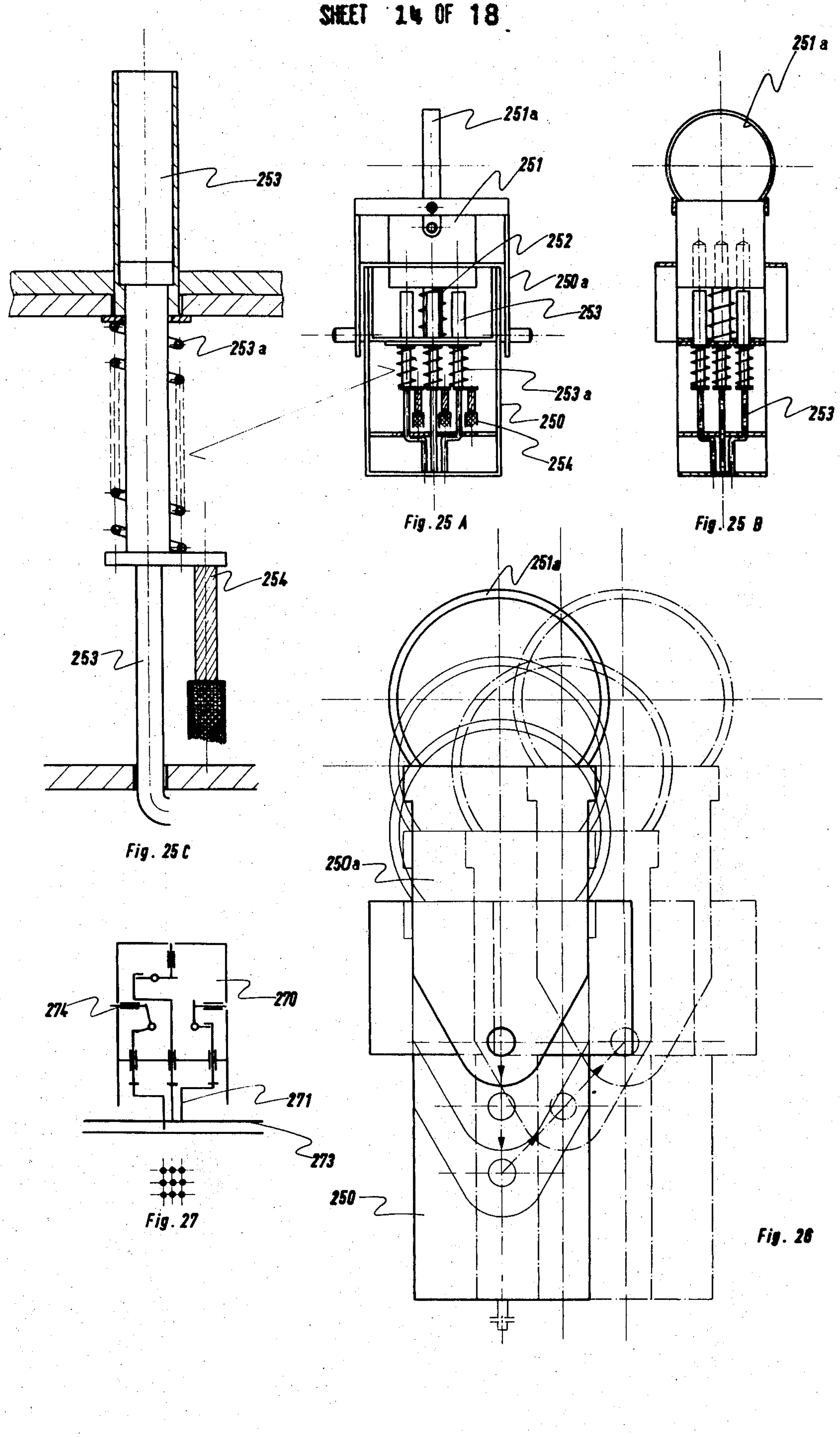
FIG. 26 is a diagram illustrating the mode of operation of the reader in FIG. 25A.
FIG. 27 is a schematic of another embodiment of a reader according to the invention.

In FIGS. 25A–25C a reading apparatus for the blind is disclosed. The apparatus has a carrier comprising a lower case portion 250 and an upper case portion **250*a* on which is fixed a plunger 251 biased upwardly by a spring 252. The plunger 251 can be operated by a ring operator 251*a*. As the plunger is moved down it engages a plurality of sensors 253 likewise biased upwardly by respective springs 253*a*. These sensors are actuated axially and are intended to sense perforations on a paper, as shown. If a perforation is sensed, the sensors each carry a flexible cable 254 which is disposed extending out of the carrier or case portions in order to be sensed by a sensitive part of a blind person's body. The cables therefore transmit the information content of the perforations to the blind person. It being understood that the blind person will receive a sensory signal from the flexible cable and the individual positions of these cables are representative of information corresponding to a perforation sensed. It is to be understood that the operator is moved up and down as illustrated in FIG. 26** and the reader must likewise be advanced as illustrated in the same FIG. in broken lines.

A second reading device for the blind is illustrated in FIG. 27 wherein an outer case 270 is illustrated diagrammatically and is mounted on a lower case portion of a reader so that a plurality of sensors 271 will sense perforations on a paper 273. It will be noted that there are three sensors so that the sensors will project outwardly, when a perforation is sensed, through openings in the casing as illustrated with respect to one of the sensors at 274. The blind reader can therefore "read" with the thumb and the first and second fingers disposed on the reading device to sense the sensors as they project.

Figures 28, 29, 30:
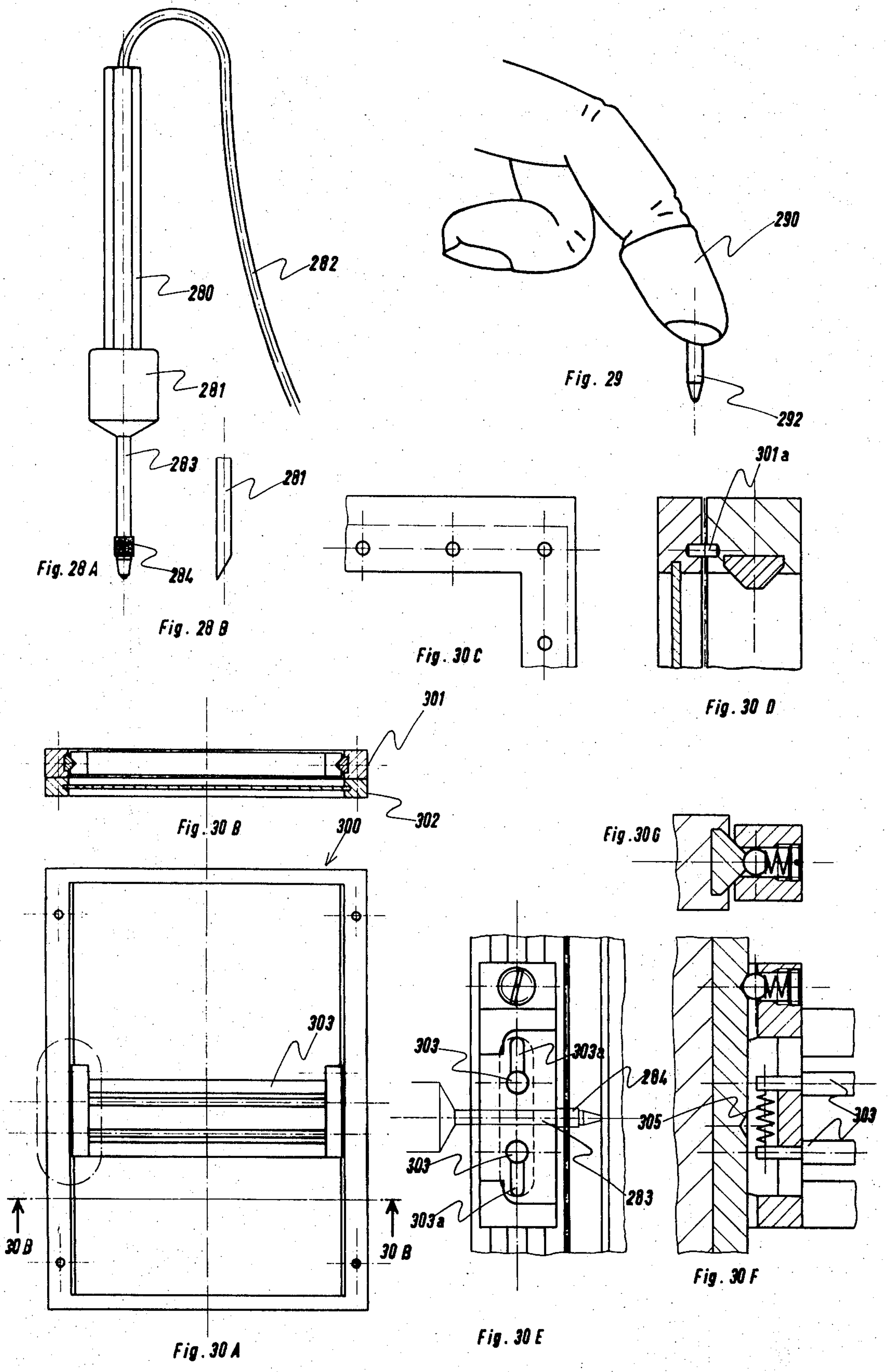
FIG. 29 is an elevation view of a thimble reader according to the invention.

FIG. 28 illustrates a writing instrument for a blind person. The instrument comprises a holder 280 provided with an electrically encased motor 281 connected electrically through electrical connections 282 to a power source, not shown. The writing device is provided with a writing element constituting a rotary driven shaft 283 provided with an abrasive 284 for cutting a cursive pattern of writing having information content in the manner illustrated in the drawings in FIG. 3D. A second type of writing element is illustrated in FIG. 28B in which the writing element 287 is a cutting element and the cutting element simply cuts through a piece of paper along the path selected by the blind person which corresponds to a writing as before described.

A thimble reader is illustrated in FIG. 29. Thus a thimble 290 is provided with a pin 292 that is engaged in the path cut by the tool in FIG. 28A and the path is traced so that the configuration of the path cut can be sensed by the finger of a blind person and interpreted as to its information content.

In order to properly trace out the path of the writing with the writing instrument described the paper is preferably held in a palette 300 in clamped position between two frames 301,302. The frames are fixed with respect to each other by pins **301*a*. A pair of bars constituting a carriage 303** determines the height of the writing. The carriage is mounted for movement on the palette to guide the blind person from one line of writing to the next and to guide the height and the lateral extent of the writing.

The two bars of the carriage are in spaced relationship and held by springs 305 at the ends so that the bars will separate slightly when contacted by the writing instrument. The bars can be limited as to separation by slots **303*a*** in one construction. The blind writer senses the contact of the writing instrument with either bar and immediately moves away from the bar contacted and continues the writing in the form illustrated in the drawings in FIG. 3D.

Figure 31A:
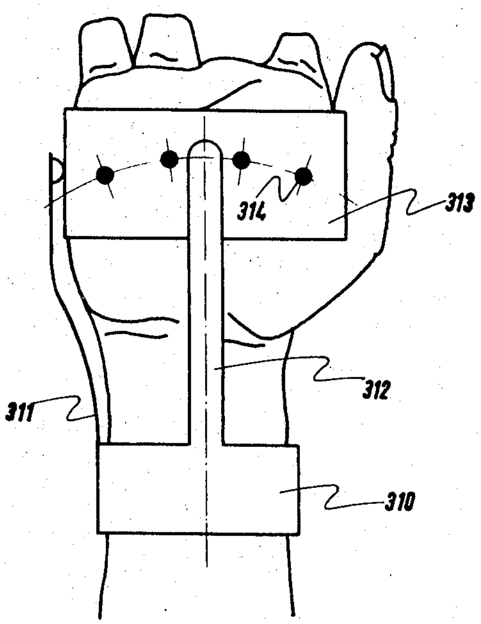
FIG. 31A is a plan view of a control device for use by the handicapped according to the invention.
Figure 31B:
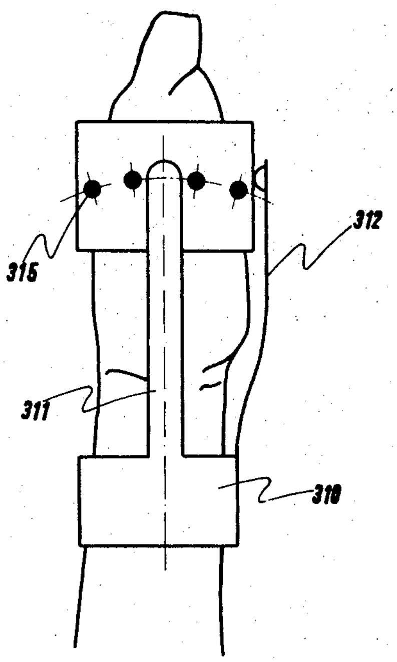
FIG. 31B is a side view of the control device in FIG. 31A.
Figure 32:
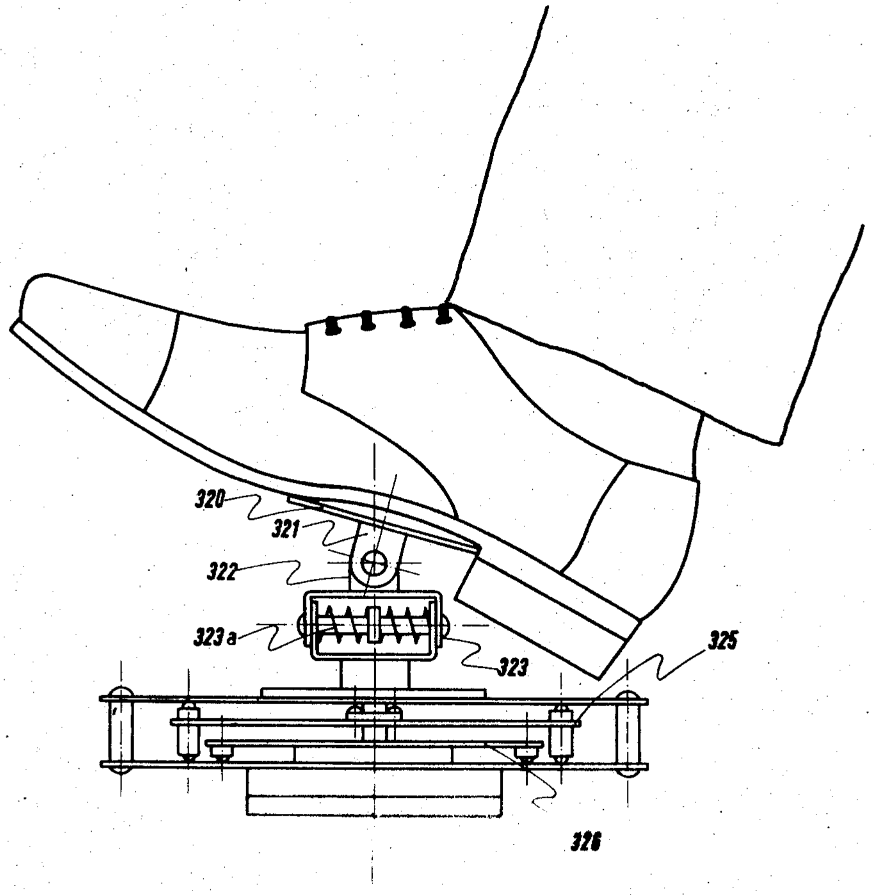
FIG. 32 is a side elevation view of a carriage-type control apparatus according to the invention.

A principal type of device employing the principles of the invention are the devices used for the handicapped. Thus as illustrated in FIGS. 31A, 31B a wristlet 310 made of an insulative material provided with contact arms 311,312 having electrical contacts thereon with electrical connections thereto, not shown, can establish a circuit through a ring, of insulating material, having a plurality of contacts 314 with electrical connections thereto, not shown. It can be seen that by manipulation of ring or the wrist the handicapped person can establish electrical contact with the contacts aligned with the palm of the hand and the flexing of the wrist can establish electrical contacts with the fixed contacts 315 so that a multiplicity of command signals can be developed by the handicapped for commanding operations by a machine and the like. Thus as illustrated in the drawing a person handicapped and without fingers can have a wristlet and a ring, as shown, mounted on his hand and can actually carry out all kinds of operational controls.

Figure 14:
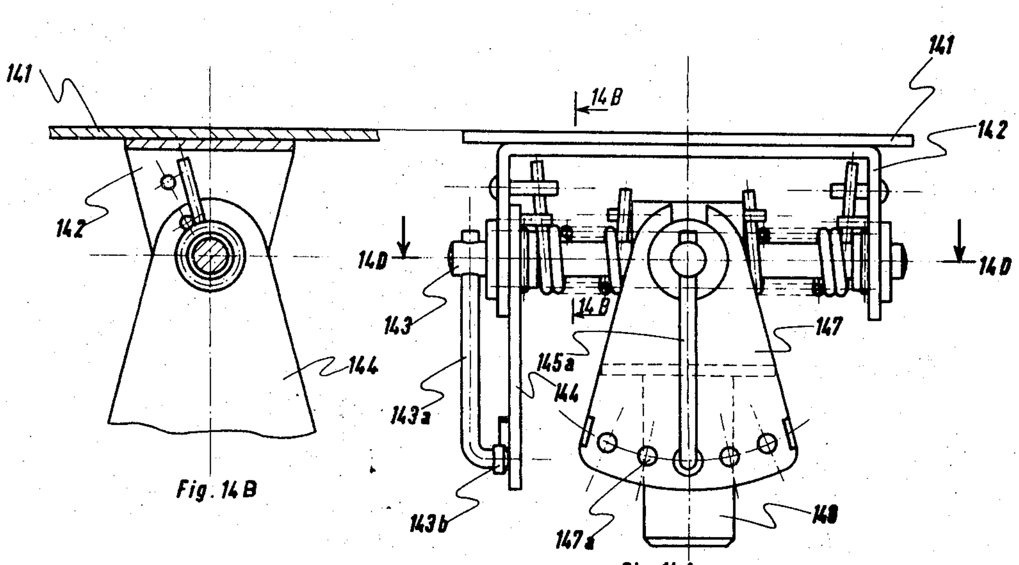
FIG. 14A is a side elevation view of apparatus according to the invention.
FIG. 14B is an end elevation view taken at section line of FIG. 14A.
FIG. 14C is a diagram for explaining the embodiment in FIGS. 14A–14D.
FIG. 14D is a section view taken along section line 14D—14D of FIG. 14A.
Figure 14C:
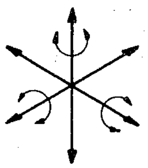
Figure 14D:
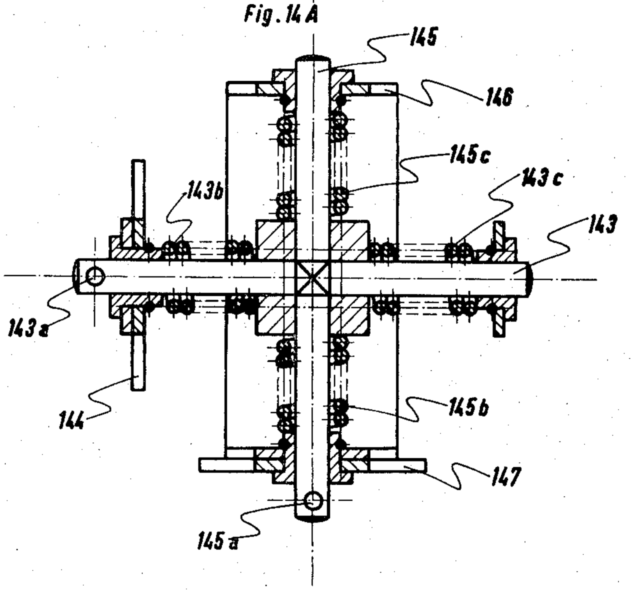

Furthermore, a person without arms can carry out operational control of a complex apparatus with the mechanism illustrated in FIGS. 14 and 15. Thus an operator 320 pivotally mounted can be engaged by the shoe of a person as illustrated in the drawing. The operator is pivotally mounted on a lever 321 and this pivoted on a second lever 322 fixed on support member 323 that is restored by a spring **323*a* on a pivot 323*b* to an upright position. The foot of the operator is able to move downwardly at the portion of the shoe toward the toes or toward the heel and laterally for translating or developing translation movement. A carriage 325** relative to a second carriage 326 to carry out a development of matrix circuit contacts to carry out development of command signals and the like. The carriage arrangements may be of the types before described for controlling matrix circuit outputs.

In order to carry out writings or development or printing of symbols as illustrated in FIG. 34, or to carry out the printing or cutting of a path of cursive writing as illustrated in the same FIG., an apparatus to execute this is provided as illustrated in FIG. 33. Therein a head 330 is provided with a plurality of pins 331, only one of which is shown, for selecting the angular positions of a plurality of rotary wheels 333 rotatable on a shaft 334 and having printing elements or punching elements 335 as the case may be on the periphery thereof. These elements are shown only in schematic form as illustrated in 335 where one of these elements is shown as biased outwardly of the periphery of a center one of the rotary wheels 333. The printing or punching element is shown as protruding outwardly from the periphery of its carrier. The relative angular relationships for developing the pattern to be printed or cut are established by establishing the angular positions of one rotary wheel to another and a plurality of pins 236 along the side of the apparatus will provide for this selection. Thus it can be seen that when the entire selection of pins is made, for example by a keyboard according to the invention then the desired printing, writing or punching on a record medium, for example paper, can be carried out according to the invention.

Those skilled in the art will understand that the apparatus in FIGS. 33A–33B can effect writings of the type in the left hand portion of FIG. 34 and also of the cursive writings on the right hand side. Moreover, the various punching devices can effect generation of the symbols in FIGS. 3E–3I. These symbols can represent music notation or other information content readable by a thimble reader or the like.

Thus it can be seen that the invention generally correlates the human language with different forms of writings. Different processes according to the invention may be converted or changed by transducers and converted by converters and memorized by registers and servomechanisms may be employed for effecting the principles of the invention as diagramed in FIG. 35.

Figure 36:
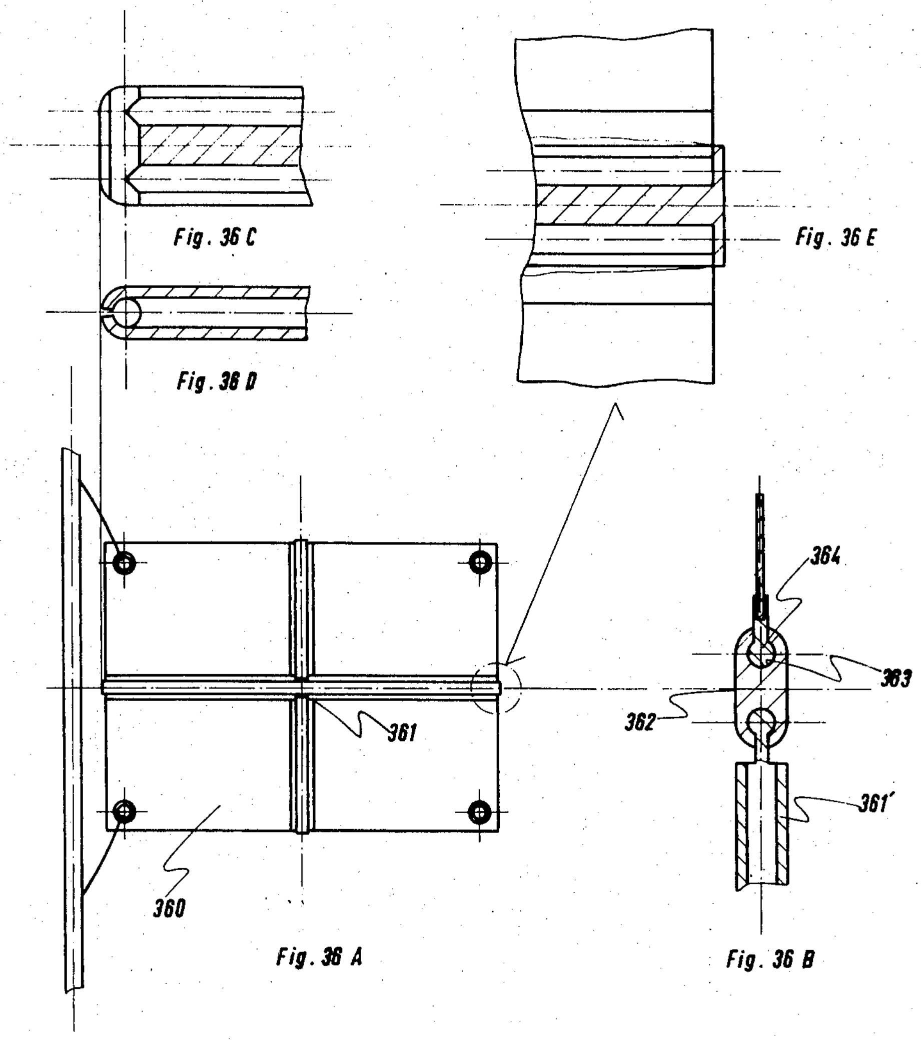
FIG. 36A is a side view of a flag assembly according to the invention.
FIG. 36B is a section view of another embodiment of a connector for connecting a pennant to a halyard.
FIG. 36C is a fragmentary section view on an enlarged scale of a mount for the flag assembly in FIG. 36A.
FIG. 36D is a fragmentary plan section view of the device in FIG. 36C.
FIG. 36E is a fragmentary elevation view on an enlarged scale and partly in section of a part of the flag assembly in FIG. 36A.
Figure 37A:
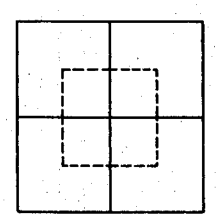
FIGS. 37A–37E are diagrams of signal combinations according to the principles of the invention.
Figure 37B:
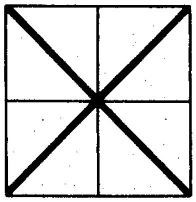
Figure 37C:
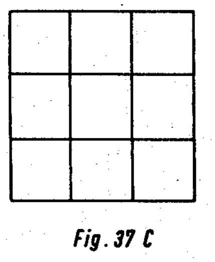
Figure 37D:
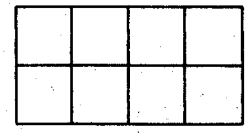
Figure 37E:
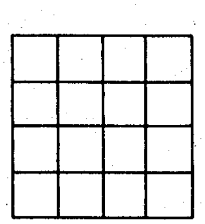

FIGS. 36A–36E illustrate the use of flags or pennants for communicating. Thus four flags 360 as shown in FIG. 36A can be combined by a holder 361 constructed as shown in FIG. 36C and FIGS. 36D and E. The flags may be mounted as shown in FIG. 36B in which a holder 361′ is shown fragmentarily held by a connector 362 having a groove 363 for connecting the end of a line 364 thereto as shown.

The flags can likewise be arranged in different patterns and/or colors as shown in FIGS. 37A–37E, to communicate traffic instructions and the like, using the principles of the constructions in FIG. 36A or otherwise holding them together.

What I claim and desire to secure by Letters Patent is:

1. Apparatus comprising, means comprising a plurality of manually depressable keys movable in a plurality of patterns of downward and upward movements with discrete depressed position of said keys in said patterns of movements corresponding to relative positions for developing outputs representative of information content for each of said discrete depressed positions, whereby variably depressing of said keys in different patterns and to different ones of said depressed positions within said patterns develops different informational contents of outputs, output means for developing outputs in dependence upon said relative depressed positions selected by said plurality of depressable keys, means for allowing individual keys to be actuated to an effective depressed position comprising taut cable means, means comprising said cable means constantly biasing said keys upwardly to a non-depressed position, and said depressable keys including a preselector key mounted on another of said keys for establishing another one of said depressed positions, lock means releasably locking said preselector key in a raised position, means on said cable disenabling said lock means when another of said keys is depressed, and said output means comprising a plurality of switches each associated with a corresponding one of said keys.

* * * * *